US008275128B2

(12) United States Patent
Nakagoe et al.

(10) Patent No.: US 8,275,128 B2
(45) Date of Patent: Sep. 25, 2012

(54) ARITHMETIC LOGICAL UNIT, COMPUTATION METHOD AND COMPUTER SYSTEM

(75) Inventors: Hiroshi Nakagoe, Yokohama (JP);
Yasushi Nagai, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1249 days.

(21) Appl. No.: 12/025,891

(22) Filed: Feb. 5, 2008

(65) Prior Publication Data

US 2009/0119355 A1 May 7, 2009

(30) Foreign Application Priority Data

Nov. 1, 2007 (JP) ................................. 2007-285520

(51) Int. Cl.
*H04L 29/06* (2006.01)
(52) U.S. Cl. .......................................... 380/29; 380/28
(58) Field of Classification Search .................. 380/28, 380/29
See application file for complete search history.

(56) References Cited

U.S. PATENT DOCUMENTS

| 8,005,209 B2* | 8/2011 | Joshi et al. ...................... 380/28 |
| 2007/0147138 A1 | 6/2007 | Ishimaru |

FOREIGN PATENT DOCUMENTS

| JP | 10154976 A | 6/1998 |
| JP | 10-187202 A | 7/1998 |
| JP | 2007-179450 A | 7/2007 |

OTHER PUBLICATIONS

"Announcing the Advanced Encryption Standard (AES)", Federal Information Processing Standards Publication 197, Nov. 26, 2001, 26 Pages.
Japanese Office Action corresponding to Japanese Patent Application No. 2007-285520, received May 1, 2012.
Kaijie Wu, et al., Low Cost Concurrent Error Detection for the Advanced Encryption Standard, International Test Conference 2004, pp. 1242-1248.

* cited by examiner

*Primary Examiner* — Jeffrey Pwu
*Assistant Examiner* — Thong Truong
(74) *Attorney, Agent, or Firm* — Sughrue Mion, PLLC

(57) ABSTRACT

This arithmetic logical unit outputs data to be used in checking the final result of an AES unit that encrypts a plain text block into an encrypted text block based on AES operation, and includes an arithmetic unit for computing parity data created based on XOR operation from an encryption key to be used as a key during AES encryption, parity data created based on XOR operation from a plain text block, and an AES operation halfway result output from the AES unit, and outputting a value that is equivalent to parity data created based on XOR operation from the final result of the AES unit.

10 Claims, 12 Drawing Sheets

| | | 4-BIT LSB OF 1 BYTE INPUT | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| 4-BIT MSB OF 1 BYTE INPUT | 0 | 1 | 0 | 1 | 1 | 0 | 0 | 1 | 1 | 1 | 0 | 0 | 1 | 0 | 1 | 0 | 0 |
| | 1 | 1 | 1 | 1 | 1 | 1 | 1 | 1 | 1 | 0 | 1 | 0 | 1 | 1 | 0 | 1 | 1 |
| | 2 | 1 | 0 | 1 | 0 | 1 | 1 | 0 | 1 | 0 | 1 | 0 | 0 | 1 | 1 | 0 | 0 |
| | 3 | 0 | 0 | 0 | 1 | 1 | 1 | 1 | 1 | 0 | 1 | 0 | 1 | 1 | 1 | 1 | 0 |
| | 4 | 1 | 0 | 0 | 0 | 1 | 0 | 1 | 1 | 0 | 0 | 0 | 0 | 0 | 0 | 0 | 1 |
| | 5 | 1 | 1 | 1 | 1 | 0 | 1 | 1 | 0 | 1 | 0 | 1 | 1 | 0 | 0 | 0 | 1 |
| | 6 | 0 | 0 | 1 | 0 | 0 | 1 | 1 | 0 | 0 | 1 | 0 | 0 | 1 | 1 | 1 | 0 |
| | 7 | 0 | 1 | 0 | 0 | 0 | 0 | 0 | 1 | 0 | 0 | 0 | 1 | 0 | 1 | 1 | 1 |
| | 8 | 0 | 1 | 0 | 0 | 1 | 0 | 1 | 1 | 0 | 0 | 1 | 0 | 0 | 0 | 0 | 0 |
| | 9 | 1 | 1 | 0 | 0 | 1 | 0 | 1 | 1 | 0 | 1 | 1 | 1 | 1 | 0 | 0 | 1 |
| | a | 0 | 0 | 1 | 1 | 0 | 1 | 1 | 1 | 0 | 0 | 1 | 0 | 0 | 1 | 1 | 0 |
| | b | 1 | 0 | 0 | 0 | 1 | 0 | 1 | 1 | 1 | 1 | 0 | 0 | 1 | 0 | 0 | 0 |
| | c | 0 | 1 | 0 | 1 | 0 | 1 | 1 | 1 | 1 | 1 | 0 | 1 | 1 | 1 | 1 | 0 |
| | d | 0 | 0 | 0 | 1 | 1 | 1 | 1 | 0 | 0 | 1 | 0 | 0 | 0 | 0 | 1 | 0 |
| | e | 1 | 0 | 0 | 1 | 1 | 0 | 1 | 0 | 0 | 1 | 1 | 0 | 0 | 1 | 1 | 0 |
| | f | 0 | 0 | 0 | 0 | 0 | 0 | 1 | 0 | 1 | 1 | 1 | 1 | 0 | 0 | 1 | 0 |

US 8,275,128 B2

ARITHMETIC LOGICAL UNIT, COMPUTATION METHOD AND COMPUTER SYSTEM

CROSS REFERENCES

This application relates to and claims priority from Japanese Patent Application No. 2007-285520, filed on Nov. 1, 2007, the entire disclosure of which is incorporated herein by reference.

BACKGROUND

The present invention generally relates to technology for dealing with soft errors of encryption/decryption means in information household appliances or computers, and in particular relates to technology for dealing with soft errors of encryption/decryption means in computer systems or storage systems demanded of highest reliability.

Today, pursuant to the formulation of the Sarbanes-Oxley Act that sets forth the reinforcement of internal control of corporations, companies must protect and manage vast volumes of document data to data centers. A data center is configured from a storage system for storing data in HDDs (Hard Disk Drives) or magnetic tape devices in order to collectively retain large volumes of data.

Since this kind of storage system retains data such as book data and the like of companies which must not be lost, it is demanded of higher reliability in comparison to a personal-use computer system. Opportunities of data loss in a storage system can be classified into opportunities of data loss caused by a hard error, which is a physical malfunction, and opportunities of data loss caused by a temporary error (soft error).

A hard error, as described above, is an error requiring the repair or replacement of a physical element such as when there is a malfunction of a HDD or a magnetic tape, or a microprocessor that controls the data storage processing in the storage system. Meanwhile, a soft error is an error that arises as a result of noise generating particles such as radioactive rays, cosmic rays, alpha waves or neutron rays discharged from radioactive substances contained in the microprocessor causing defective performance of hardware without destroying such hardware. In recent years, defective performance caused by soft errors is becoming prominent due to the deterioration in the operating voltage or increase in the clock frequency of LSI caused by the high integration of hardware.

Conventional highly-reliable systems have protected the hardware from defective performance caused by soft errors based on a protection method of using devices that have high soft error resistance, a protection method based on multiplexing and majority of the same processing circuit as shown in Japanese Patent Application No. 8-344042 ("Patent Document 1"), and a protection method based on a parity bit check as shown in Japanese Patent Laid-Open Publication No. 2007-179450 ("Patent Document 2").

The protection method based on multiplexing and majority described in Patent Document 1 is, specifically, a method of detecting and correcting an error by making redundant a plurality of circuits having the same function, and deciding the majority among data that are output from the plurality of redundant circuits.

In addition, the protection method described in Patent Document 2 is a parity bit checking method of retaining parity created from data in an area that is separate from such data in the memory elements and detecting an error between the parity created from the data and the retained parity upon reading the data, or a method of correcting the error based on ECC (Error Checking and Correct), and not according to the parity bit.

Here, parity refers to a value retaining the parity of the given data. For instance, if 4-bit data of "1001" is given, the odd parity will be "1" calculated based on (1^0^0^1), and the even parity will be "0" calculated based on (1^0^0^1). When using parity, it is necessary to designate whether to use odd parity or even parity in the sending side (side retaining parity) and the receiving side (side checking parity), and the data unit for performing parity operation.

As one topic concerning the storage system, there is the problem of information leakage caused by the theft of HDDs. Encrypting the data stored in the HDD is one method of preventing such information leakage caused by the theft of HDDs.

Block cipher is widely used for encrypting the data stored in HDDs. Block cipher is a symmetric key cipher method that partitions data into block data of a fixed length, encrypts such block data in block units with a key or IV (Initial Vector), and outputs the encrypted data of the same length. As of 2007, AES (Advanced Encryption Standard) described in FIPS 197 Announcing the ADVANCED ENCRYPTION STANDARD (AES) http://csrc.nist.gov/publications/fips/fips197/fips-197.pdf (Non-Patent Document 1) is the substantial global standard.

AES is an block cipher algorithm having a spin structure (SPN structure) that sets the block unit size to 128 bits, and repeats cipher processing (substitution) and transposition processing (permutation) to the block units in processing units referred to as a round. In addition, AES is also a block cipher algorithm that performs data conversion in each round and 8-bit units using a 16×16 table known as an S-box.

AES has a high processing load and much time is required until the processing is completed due to the repeated processing of data according to the spin structure described above and the S-box conversion processing in 8-bit units. When loading the AES function in a storage system demanded of fast data transfer performance, deterioration in the processing throughput and occurrence of processing latency caused by the foregoing AES processing are problems that should be avoided, and in order to lower the costs, the AES function is generally mounted as hardware such as a microprocessor for controlling the data storage.

In addition, when mounting the AES function as hardware, there are cases where, in order to improve the AES processing throughput, 16 S-boxes are prepared to perform processing in 128 bits rather than preparing just 1 S-box and performing processing in 8 bits. Moreover, when high speed processing performance is demanded, each round processing may be designed independently, and a pipeline architecture that connections such rounds may be used to improve the AES processing throughput.

In order to improve the soft error resistance of an AES circuit mounted as hardware such as a microprocessor in a storage system, conventionally, the method described in Patent Document 1 was used to multiplex the overall AES circuit, and detect and correct the error by taking a majority among the results output from a plurality of AES circuits, or the method described in Patent Document 2 was used to retain parity created from the result output from the AES operation execution logic in a latch circuit separately from storing the result output from the AES operation execution logic in a latch circuit that is separate from the foregoing latch circuit, and detect and correct the error by comparing the parity created from the result and the separately retained result parity upon reading the result from the latch circuit.

Nevertheless, with the AES circuit protection method employing the method described in Patent Document 1, the circuit size will become enlarged since a plurality of AES circuits are mounted. As described above, enlargement of the circuit size will be significant in the design of preparing S-boxes for 16 circuits or in the design based on a pipeline architecture. Not only will the enlargement of the circuit size lead to increased hardware costs, it also entails a problem of preventing other functions from being incorporated into the microprocessor.

In addition, since AES is operated at 128-bit units, the data protection strength based on the AES circuit protection employing the method described in Patent Document 1 can be 128 bits. Here, for example, if the soft error rate is at a level of causing an error in only 1 bit among the 8 bits, it would suffice to detect errors in 8-bit units without protecting all bits, and the method of Patent Document 1 will be a case of overspecification. Meanwhile, the AES circuit protection method employing the method described in Patent Document 2 is not able to deal with soft errors arising in the AES operation execution logic.

SUMMARY

The present invention was devised in view of the foregoing points. Thus, an object of this invention is to propose an arithmetic logical unit, a computation method and a computer system capable of maintaining the reliability of a computer system with a simple configuration.

In order to achieve the foregoing object, the present invention provides an arithmetic logical unit for outputting data to be used in checking the final result of an AES unit that encrypts a plain text block into an encrypted text block based on AES operation. This arithmetic logical unit comprises an arithmetic unit for computing parity data created based on XOR operation from an encryption key to be used as a key during AES encryption, parity data created based on XOR operation from a plain text block, and an AES operation halfway result output from the AES unit, and outputting a value that is equivalent to parity data created based on XOR operation from the final result of the AES unit.

Specifically, the present invention includes a RotWord parity arithmetic unit for outputting a value that is equivalent to parity data created from output data of a RotWord arithmetic unit of an AES unit directly from parity data of data computed up to the previous stage in AES operation, a SubWord parity arithmetic unit for outputting a value that is equivalent to parity created from output data from a SubWord arithmetic unit of an AES unit directly from data computed up to the previous stage in AES operation and its parity data, an AddRoundKey parity arithmetic unit for outputting a value that is equivalent to parity created from output data of an AddRoundKey arithmetic unit of an AES unit directly from parity data of data computed up to the previous stage in AES operation, a SubBytes parity arithmetic unit for outputting a value that is equivalent to parity created from output data of a SubBytes arithmetic unit of an AES unit directly from data computed up to the previous stage in AES operation and its parity data, a ShiftRows parity arithmetic unit for outputting a value that is equivalent to parity created from output data of a ShiftRows arithmetic unit of an AES unit directly from parity data of data computed up to the previous stage in AES operation, and a MixColumns parity arithmetic unit for outputting a value that is equivalent to parity created from output data of a MixColumns arithmetic unit of an AES unit directly from data computed up to the previous stage in AES operation and its parity data.

The present invention additionally provides a computation method of an arithmetic logical unit for outputting data to be used in checking the final result of an AES unit that encrypts a plain text block into an encrypted text block based on AES operation. This computation method comprises a computing step of computing parity data created based on XOR operation from an encryption key to be used as a key during AES encryption, parity data created based on XOR operation from a plain text block, and an AES operation halfway result output from the AES unit, and outputting a value that is equivalent to parity data created based on XOR operation from the final result of the AES unit.

The present invention further provides a computer system for storing data sent from a host system. This computer system comprises an AES unit that encrypts data sent from the host system from a plain text block into an encrypted text block based on AES operation, an arithmetic unit for outputting data to be used in checking the final result of the AES unit, and a parity check unit for comparing parity data created based on XOR operation from the final result of the AES unit, and the final result of the arithmetic unit. The arithmetic unit computes parity data created based on XOR operation from an encryption key to be used as a key during AES encryption, parity data created based on XOR operation from a plain text block, and an AES operation halfway result output from the AES unit, and outputs a value that is equivalent to parity data created based on XOR operation from the final result of the AES unit.

The present invention also provides an arithmetic logical unit for outputting data to be used in checking the final result of an AES decryption unit that decrypts an encrypted text block into a plain text block based on AES operation. This arithmetic logical unit comprises an arithmetic unit for computing parity data created based on XOR operation from a decryption key to be used as a key during AES decryption, parity data created based on XOR operation from an encrypted text block, and an AES operation halfway result output from the AES decryption unit, and outputting a value that is equivalent to parity data created based on XOR operation from the final result of the AES decryption unit.

Accordingly, as a result of comparing parity data created from the final result output from the AES unit or the AES decryption unit and the final result output from the AES parity computing means, it is possible to detect an error in the final result upon encrypting the data to be stored based on AES. It is thereby possible to protect the data to be stored. In addition, since it is possible to reduce the circuit size in comparison to a data protection method based on multiplexing, the soft error can be detected at a parity level throughout the AES circuit.

According to the present invention, it is possible to realize an arithmetic logical unit, a computation method and a computer system capable of maintaining the reliability of a computer system with a simple configuration.

DESCRIPTION OF DRAWINGS

FIG. 5 is a block diagram explaining a table to be used in a SubWord parity conversion unit;

DETAILED DESCRIPTION (1) Embodiment 1

Figure 1:
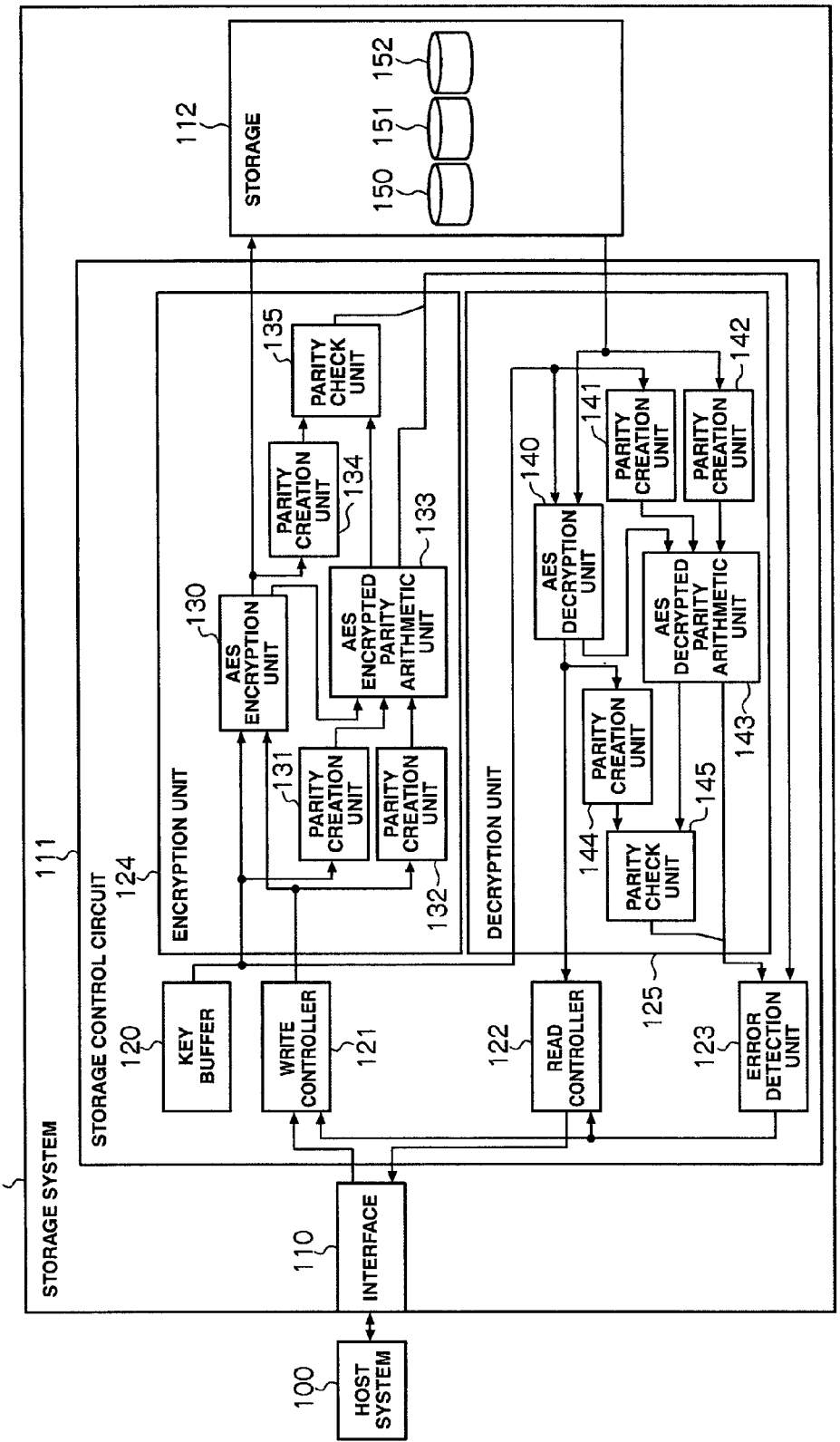
FIG. 1 is a block diagram showing an embodiment of the present invention.

An embodiment of the present invention is now explained in detail with reference to the attached drawings. Components with the same reference numeral in all drawings have the same function and, therefore, the detailed explanation thereof is omitted.

FIG. 1 is a configuration diagram showing a storage system according to an embodiment of the present invention. Let it be assumed that the storage system of Embodiment 1 is a system that encrypts (decrypts) data to be stored in the storage based on AES by using an encryption key having a key length of 128 bits, and protects data by creating parity of the handled data in 8-bit units. In Embodiment 1, let it also be assumed that data is aligned in Big Endian.

In FIG. 1, a host system 100 is an apparatus such as an information household appliance or a computer that uses the data stored in a storage system 101.

The storage system 101 comprises an interface 110, a storage control circuit 111, and a storage 112. The interface 110 controls the data transfer between the host system 100 and the storage control circuit 111. The storage control circuit 111 controls the reading and writing of data from and into the storage 112. The storage 112 stores the data transferred from the storage control circuit 111 to storage units 150 to 152 such as HDDs and magnetic tapes.

The storage control circuit 111 comprises a key buffer 120, a write controller 121, a read controller 122, an error detection unit 123, an encryption unit 124, and a decryption unit 125.

The key buffer 120 retains an encryption key to be used in the encryption to be executed by the encryption unit 124 upon storing the data transferred from the host system 100 in the storage 112, and in the decryption to be executed by the decryption unit 125 upon transferring the data stored in the storage 112 to the host system 100.

The write controller 121 controls the processing of writing the data transferred from the host system 100 into the storage 112. Similarly, the read controller 122 controls the processing of reading the data stored in the storage 112 upon transferring such data from the storage 112 to the host system 100.

The error detection unit 123 detects the data error notified from the encryption unit 124 or the decryption unit 125, and notifies a data retransfer request to the write controller 121 or the read controller 122. The encryption unit 124 encrypts the data transferred from the write controller 121 in order to store encrypted data in the storage 112. The decryption unit 125 decrypts the data stored in the storage 112 and transfers such data to the read controller 122.

The encryption unit 124 comprises an AES unit 130, parity creation units 131, 132, 134, an AES encrypted parity arithmetic unit 133, and a parity check unit 135. The AES unit 130 encrypts the data transferred from the write controller 121 based on AES by using encryption key information transferred from the key buffer 120.

The parity creation unit 131 creates parity from the encryption key data transferred from the key buffer 120. The parity creation unit 132 creates parity from the data transferred from the write controller 121. The AES encrypted parity arithmetic unit 133 outputs a value that is equivalent to the output data of the parity creation units 131, 132, and the output data of the parity creation unit 134 that creates parity by inputting the halfway result output from the AES unit 130, and inputting the final result output by the AES unit 130.

The parity check unit 135 inputs the output data of the parity creation unit 134 and the output data of the AES encrypted parity arithmetic unit 133, compares the two input data and, if the data are different, notifies an error to the error detection unit 123. The parity creation units 131, 132, 134 create parity of the respectively input data in 8-bit units.

The decryption unit 125 comprises an AES decryption unit 140, parity creation units 141, 142, 144, an AES decrypted parity arithmetic unit 143, and a parity check unit 145. The AES decryption unit 140 decrypts the data transferred from the storage 112 based on AES by using the encryption key information transferred from the key buffer 120. The parity creation unit 141 creates parity from the encryption key data transferred from the key buffer 120.

The parity creation unit 142 creates parity from the data transferred from the storage 112. The AES decrypted parity arithmetic unit 143 outputs a value that is equivalent to the output data of the parity creation units 141, 142, and the output data of the parity creation unit 144 that creates parity by inputting the halfway result output from the AES decryption unit 140, and inputting the final result output by the AES decryption unit 140. The parity check unit 145 inputs the output of the parity creation unit 144 and the output data of the AES decrypted parity arithmetic unit 143, compares the two input data and, if the data are different, notifies an error to the error detection unit 123. The parity creation units 141, 142, 144 create parity of the respectively input data in 8-bit units.

The AES encrypted parity arithmetic unit 133 and the AES unit 130 are now explained in detail with reference to FIG. 2.

Figure 2:
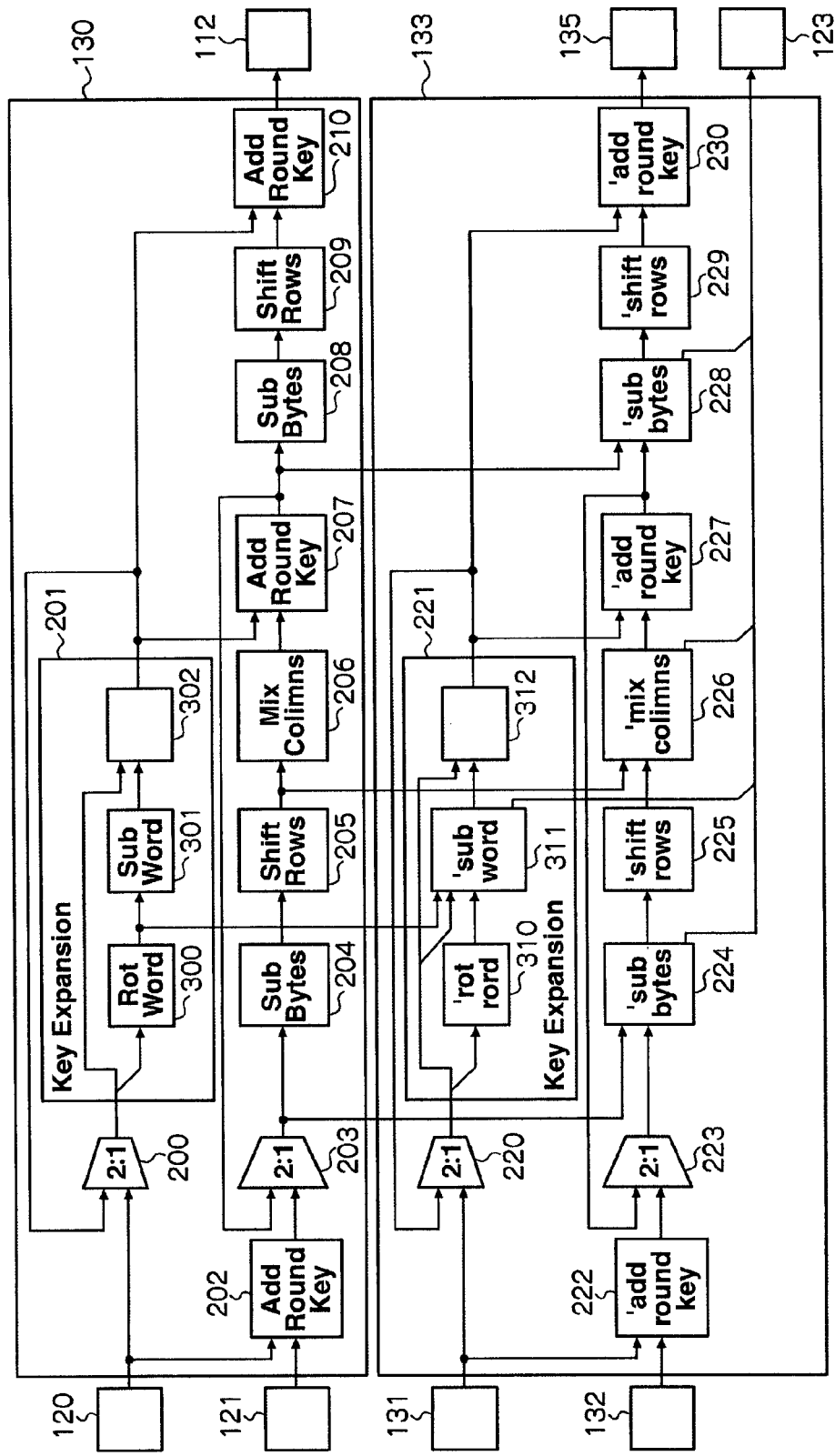
FIG. 2 is a block diagram explaining the details of an encryption processor and an encrypted parity processor.

In FIG. 2, a selector 200 is a selector for inputting the encryption key data transferred from the key buffer 120 and the output data of the KeyExpansion arithmetic unit 201, and outputting one of the two input data according to the internally retained round count. The selector 200 outputs the encryption key data transferred from the key buffer 120 only when the internally retained round count is 0.

The KeyExpansion arithmetic unit 201 is a computing means for inputting the output of the selector 200 and performing key expansion operation in the AES encryption, and is configured from a RotWord arithmetic unit 300, a SubWord arithmetic unit 301, and an arithmetic unit 302.

The RotWord arithmetic unit 300 is a computing means for inputting only the lower 32 bits of the 128-bit output data output from the selector 200, and rotating this in 8-bit units. The SubWord arithmetic unit 301 is a SubWord computing means for inputting the output data of the RotWord arithmetic unit 300, and performing nonlinear conversion to the input data in 8-bit units based on the S-box.

The arithmetic unit 302 is a computing means for inputting the output data of the selector 200 and the output data of the SubWord arithmetic unit 301, XORing the input data from the SubWord arithmetic unit 301 with a constant determined for each round referred to as an Rcon, and sequentially performing XOR operation of the XOR results of the data partitioned into 32-bit units and the upper data thereof to the input data from the selector 200 divided in 32-bit units.

The AddRoundKey arithmetic unit 202 is a means for inputting the encryption key data output from the key buffer 120 and the output data from the write controller 121, and performing AddRoundKey operation in the AES operation that XORs two inputs.

The selector 203 is a selector for inputting the output data from the AddRoundKey arithmetic unit 202 and the output data from the AddRoundKey arithmetic unit 207, and outputting one of the two input data according to the internally retained round count. The selector 203 outputs the output data from the AddRoundKey arithmetic unit 202 only when the internally retained round count is "0."

The SubBytes arithmetic unit 204 is a means for inputting the output data of the selector 203, and performing SubBytes operation in the AES operation that performs nonlinear conversion in 8-bit units based on the S-box. The ShiftRows arithmetic unit 205 is a means for inputting the output data of the SubBytes arithmetic unit 204, and performing ShiftRows operation in the AES operation that performs rotate operation in 8-bit units.

The MixColumns arithmetic unit 206 is a means for inputting the output data of the ShiftRows arithmetic unit 205, and performing MixColumns operation in the AES operation that multiplies data on GF(2^8) in 32-bit units. The AddRoundKey arithmetic unit 207 inputs the output data from the KeyExpansion arithmetic unit 201 and the output data from the MixColumns arithmetic unit 206, and performs operation that is equivalent to the AddRoundKey arithmetic unit 202.

The SubBytes arithmetic unit 208 inputs the output data from the AddRoundKey arithmetic unit 207, and performs operation that is equivalent to the SubBytes arithmetic unit 204. The ShiftRows arithmetic unit 209 inputs the output data from the SubBytes arithmetic unit 208, and performs operation that is equivalent to the ShiftRows arithmetic unit 205.

The AddRoundKey arithmetic unit 210 inputs the output data from the KeyExpansion arithmetic unit 201 and the output data from the ShiftRows arithmetic unit 209, and performs operation that is equivalent to the AddRoundKey arithmetic unit 202.

The selector 220 is a selector for inputting the encryption key data output from the parity creation unit 131 and the output data of the KeyExpansion arithmetic unit 221 (indicated as 'keyExpansion in FIG. 2), and outputting one of the two input data according to the internally retained round count. The selector 200 outputs the encryption key data output from the parity creation unit 131 only when the internally retained round count is 0.

The KeyExpansion parity arithmetic unit 221 is a computing means for inputting the output data of the selector 220, and outputting a value that is equivalent to the parity created from the output data of the KeyExpansion arithmetic unit 201, and is configured from a RotWord parity arithmetic unit 310 (indicated as 'rotword in FIG. 2), a SubWord parity arithmetic unit 311 (indicated as 'subword in FIG. 2), and an arithmetic unit 312.

The RotWord parity arithmetic unit 310 is a computing means for inputting only the lower 4 bits of the 16-bit output data of the selector 220, and outputting a value that is equivalent to the parity created from the output data of the RotWord arithmetic unit 300.

Figure 3:
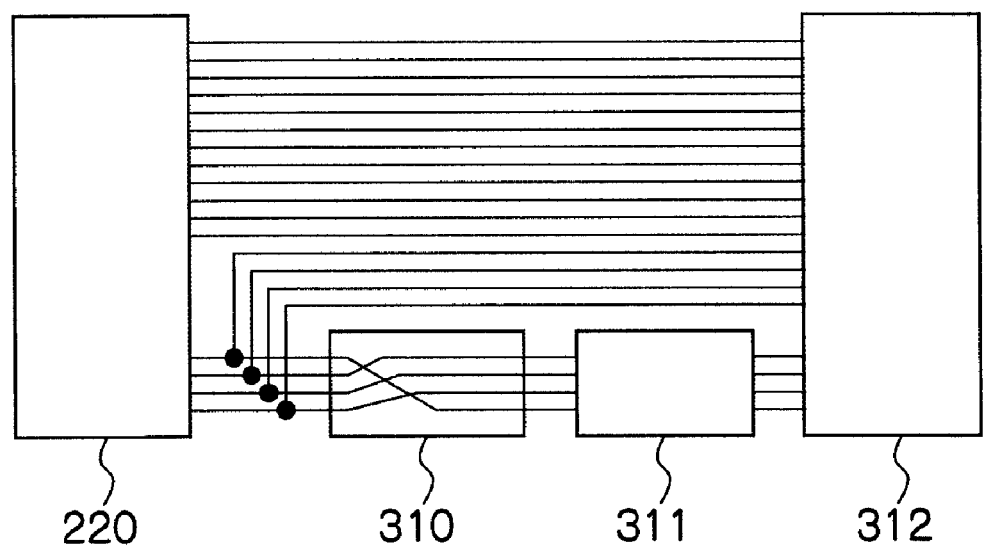
FIG. 3 is a block diagram explaining the details of a RotWord parity arithmetic unit.

The RotWord parity arithmetic unit 310 is now explained in detail with reference to FIG. 3. The RotWord parity arithmetic unit 310 rotates the 4-bit worth of parity to be input in 1-bit units. Here, in order to protect the data to be processed in the RotWord arithmetic unit 300 at a parity level, the RotWord parity arithmetic unit 310 should output a value that is equivalent to the parity created from the output data of the RotWord arithmetic unit 300. The data to be output from the selector 200 is either data to be output from the key buffer 120 or data to be output from the KeyExpansion arithmetic unit 210, and it is self-evident that the data to be output from the key buffer 120 can be protected at a parity level based on the parity created with the parity creation unit 131. The security of data to be output from the KeyExpansion arithmetic unit 210 will be described later.

Operation to be performed by the RotWord arithmetic unit 300 is rotate operation in 8-bit units, and will not interact with the parity operation to be performed within 8 bits. Accordingly, protection of the operation to be performed by the RotWord arithmetic unit 300 at a parity level is secured by the RotWord parity arithmetic unit 310.

The SubWord parity arithmetic unit 311 is a computing means for inputting the output data from the RotWord arithmetic unit 300, the output data from the selector 220, and the output data from the RotWord parity arithmetic unit 310, and outputting a value that is equivalent to the parity created from the output data of the SubWord arithmetic unit 301.

Figure 4:
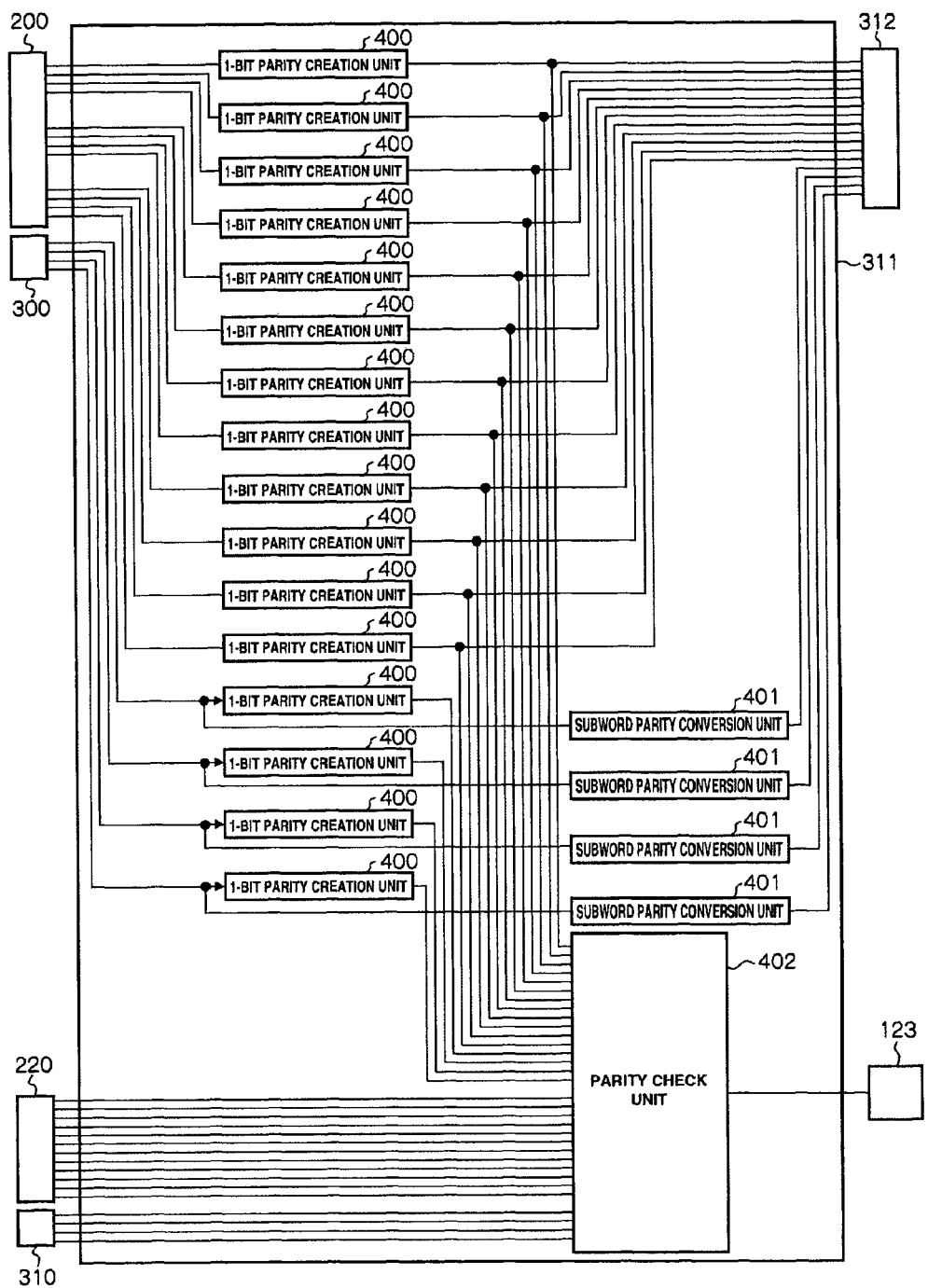
FIG. 4 is a block diagram explaining the details of a SubWord parity arithmetic unit.

The SubWord parity arithmetic unit 311 is now explained in detail with reference to FIG. 4. The SubWord parity arithmetic unit 311 is configured from a parity creation unit 400, a SubWord parity conversion unit 401, and a parity check unit 402. The parity creation unit 400 inputs 8-bit data and creates 1-bit parity. The SubWord parity conversion unit 401 inputs 8-bit data and converts it into 1-bit parity using the S-box parity conversion table 500 shown in FIG. 5.

The S-box parity conversion table 500 shown in FIG. 5 is a table that uses the upper 4 bits and the lower 4 bits of the input 8-bit data respectively as the matrix index, and directly converts the 8-bit data, which is the result of the S-box table conversion described in Non-Patent Document 1, into parity created from such 8-bit data.

Returning to FIG. 4, the parity check unit 402 compares the 16-bit parity data created from 16 parity creation units 400, and the total 16 bits including the upper 12-bit output data from the selector 220 and the 4-bit output data from the RotWord parity arithmetic unit 310 and, if the data are different, notifies an error to the error detection unit 123.

Here, in order to protect the data to be processed with the SubWord arithmetic unit 301 at a parity level, the SubWord parity arithmetic unit 311 should output a value that is equivalent to the parity created from the output data of the SubWord arithmetic unit 301. Since the operation of the SubWord arithmetic unit 301 is a nonlinear conversion operation to be performed to the 128-bit data to be input in 8-bit units, it is not possible to seek data that is equivalent to the parity created from the output data of the SubWord arithmetic unit 301 directly from the data to be input from the RotWord parity arithmetic unit 310 to the SubWord parity arithmetic unit 311; that is, the data that is equivalent to the parity created from the output data of the RotWord arithmetic unit 300.

Thus, when the SubWord parity arithmetic unit 311 is to seek the data that is equivalent to the parity created from the output data of the SubWord arithmetic unit 301, the data to be output from the RotWord arithmetic unit 300 will be required. Thereby, when the SubWord parity arithmetic unit 311 is to use the data to be output from the RotWord arithmetic unit 300, the parity creation unit 400 and the parity check unit 402 are prepared to check whether an error has occurred in the output data of the RotWord arithmetic unit 300 at a parity level.

In light of the fact that the S-box parity conversion table used in the SubWord parity conversion unit 402 is merely a table for directly converting the 8-bit data, which is the result of the S-box table conversion described in Non-Patent Document 1, into parity created from such 8-bit data, and the occurrence of an error in the operation up to the RotWord arithmetic unit 300 is checked at a parity level using the output data of the RotWord arithmetic unit 300 and the output data of the RotWord parity arithmetic unit 301, protection of the operation to be performed by the SubWord arithmetic unit 301 at a parity level is secured by the SubWord parity arithmetic unit 311.

The arithmetic unit 312 inputs the output data of the selector 220 and the output data of the SubWord parity arithmetic unit 311, and XORs the input data from the SubWord parity arithmetic unit 311 with the parity created from the Rcon described above. The arithmetic unit 312 is a computing means for sequentially performing XOR operation of the respective upper data partitioned into 4-bit units and the foregoing XOR result to the input data from the selector 220 divided into 4-bit units.

Figure 6:
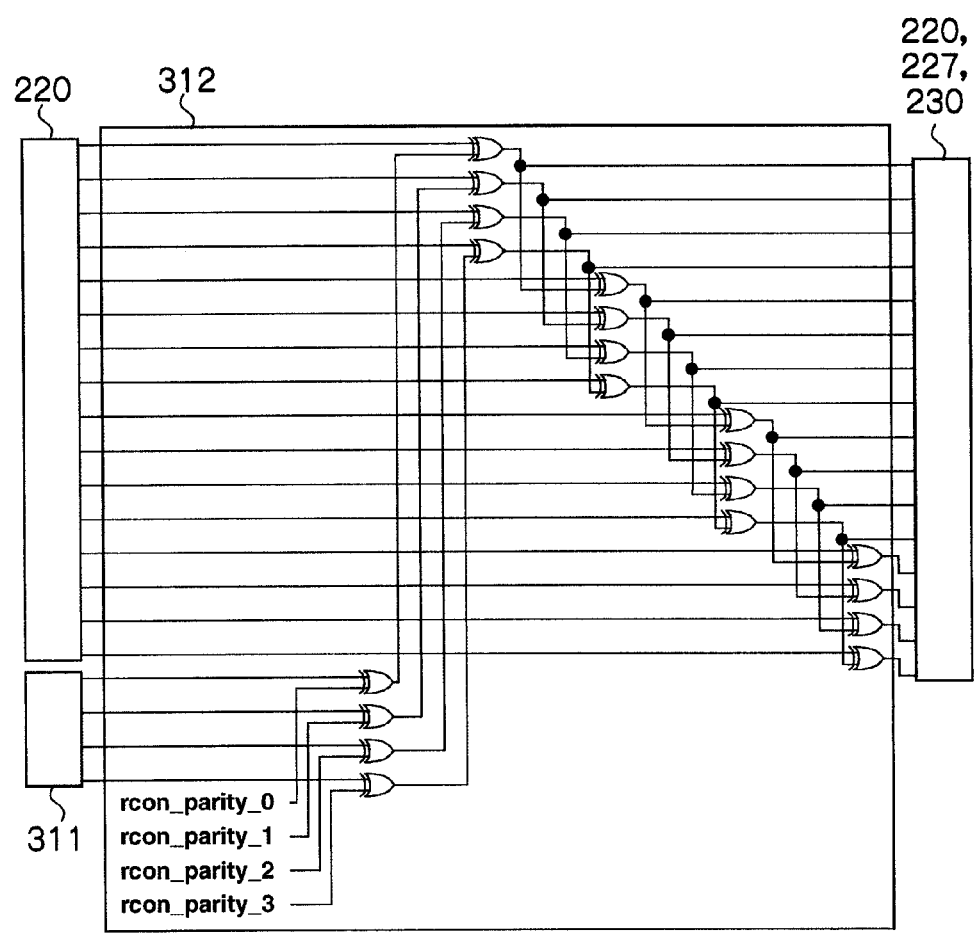
FIG. 6 is a block diagram explaining the details of an arithmetic unit of a KeyExpansion parity arithmetic unit.

The arithmetic unit 312 is now explained in detail with reference to FIG. 6. The arithmetic unit 312 performs XOR operation to the lower 4-bit input data from the SubWord parity arithmetic unit 311, and the 4-bit parity created from the foregoing Rcon (Indicated as "Rcon parity." Since the Rcon parity is a constant, in FIG. 6, these are indicated as rcon_parity_0, rcon_parity_1, rcon_parity_2, rcon_parity_3 in 1-bit units).

Here, the Rcon parity is data in which 32-bit Rcon is partitioned into 8-bit units, and sought as a 1-bit parity from the respectively partitioned 8-bit data. In addition, the result of XORing the foregoing Rcon parity and the 4-bit data input from the SubWord parity arithmetic unit 311 will be referred to as temp parity.

Here, the arithmetic unit 312 XORs the upper 4 bits of the 16-bit data input from the selector 220 and the temp parity, XORs the foregoing XOR result (wp[0]) and the upper 4 bits of the second 16-bit data input from the selector 220, XORs the foregoing XOR result (wp[1]) and the upper 4 bits of the third 16-bit data input from the selector 220, and XORs the foregoing XOR result (wp[2]) and the lowermost 4 bits of the 16-bit data input from the selector 220 (let it be assumed that the XOR result is wp[3]).

The arithmetic unit 312 outputs wp[0] to wp[3] to the selector 220, or the corresponding bits of the AddRoundKey parity arithmetic units 227, 230. Here, in order to protect the data to be processed with the arithmetic unit 302 at a parity level, the arithmetic unit 312 should output a value that is equivalent to the parity created from the output data of the arithmetic unit 302. The operation to be executed by the arithmetic unit 312 is operation which reduced the operation of the arithmetic unit 302 at a parity level. In other words, while the arithmetic unit 302 performs operation in 32-bit units, parity creation is operated in 8-bit units, and these operations will not influence each other.

Thus, protection of the operation to be performed by the arithmetic unit 302 is secured by the arithmetic unit 312. Incidentally, since the upper 12-bit output data from the selector 220 and the upper 12-bit data output from the SubWord parity arithmetic unit 311 are equivalent, either data may be used.

The AddRoundKey parity arithmetic unit 222 (indicated as 'addroundkey in FIG. 2) is a computing means for inputting the encryption key parity output from the parity creation unit 131, and the data parity created from the parity creation unit 132, and performing XOR operation to the two inputs.

Figure 7:
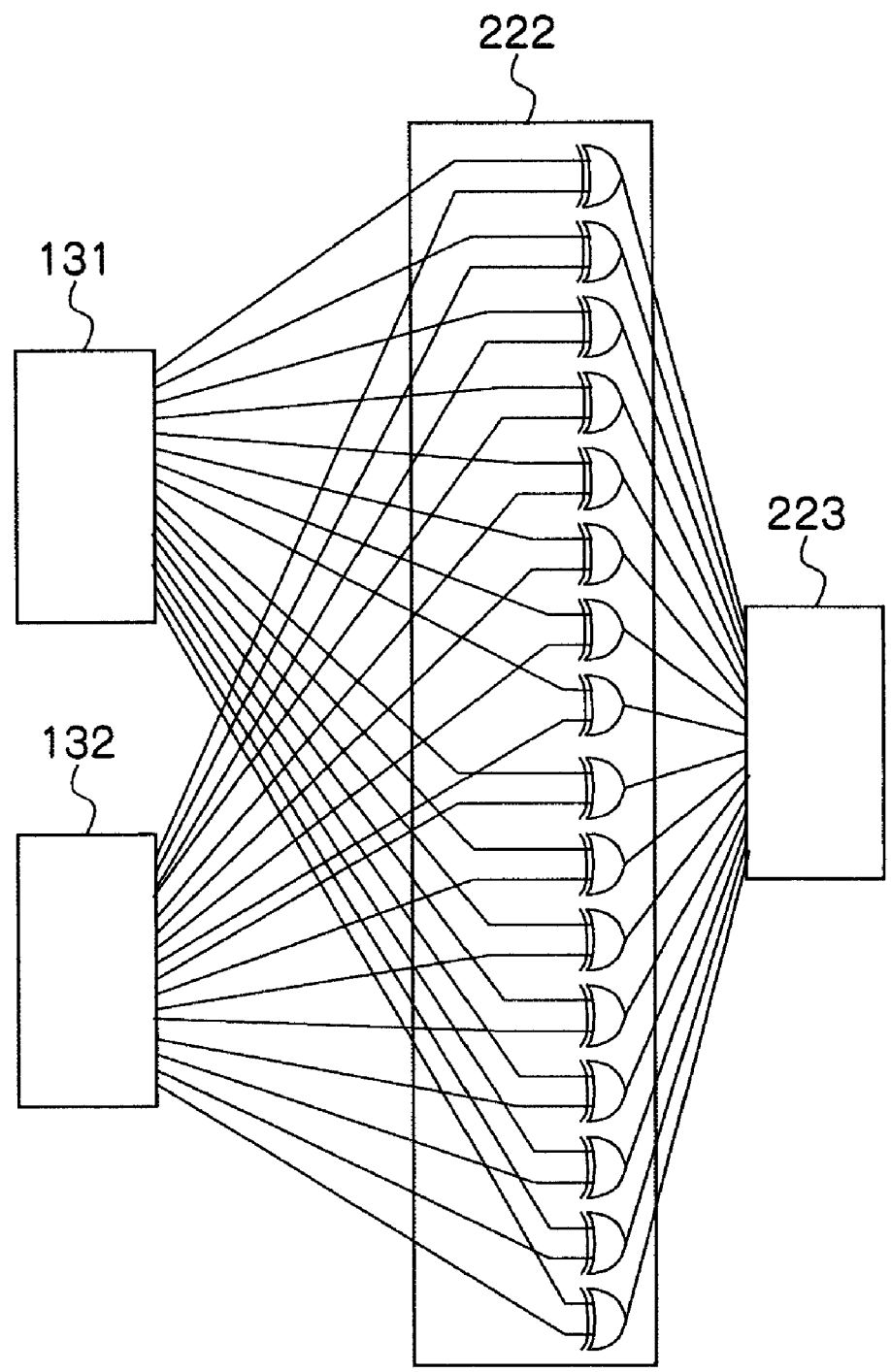
FIG. 7 is a block diagram explaining the details of an AddRoundKey parity arithmetic unit.

The AddRoundKey parity arithmetic unit 222 is now explained in detail with reference to FIG. 7. The AddRoundKey parity arithmetic unit 222 inputs the 16-bit encryption key parity output from the parity creation unit 131 and the 16-bit data parity created from the parity creation unit 132, and performs XOR operation to the corresponding bits of the two inputs.

Here, in order to protect the data to be processed with the AddRoundKey arithmetic unit 202 at a parity level, the AddRoundKey arithmetic unit 222 should output a value that is equivalent to the parity created from the output of the AddRoundKey arithmetic unit 202. The AddRoundKey operation and the parity operation are both configured from XOR only, and, therefore, (a) to create parity after the AddRoundKey operation and (b) to perform the AddRoundKey operation after the creation of the parity are equivalent. Thus, protection of the operation to be performed by the AddRoundKey arithmetic unit 202 is secured at a parity level by the AddRoundKey parity arithmetic unit 222.

The selector 223 is a selector for inputting the output data from the AddRoundKey parity arithmetic unit 222 and the output data from the AddRoundKey parity arithmetic unit 227, and outputting one of the two input data according to the internally retained round count. The selector 223 outputs the input data from the AddRoundKey parity arithmetic unit 222 only when the internally retained round count is "0."

The SubBytes parity arithmetic unit 224 is a computing means for inputting the output data from the selector 203 and the output data from the selector 223, and outputting a value that is equivalent to the parity created from the output data of the SubBytes arithmetic unit 204.

Figure 8:
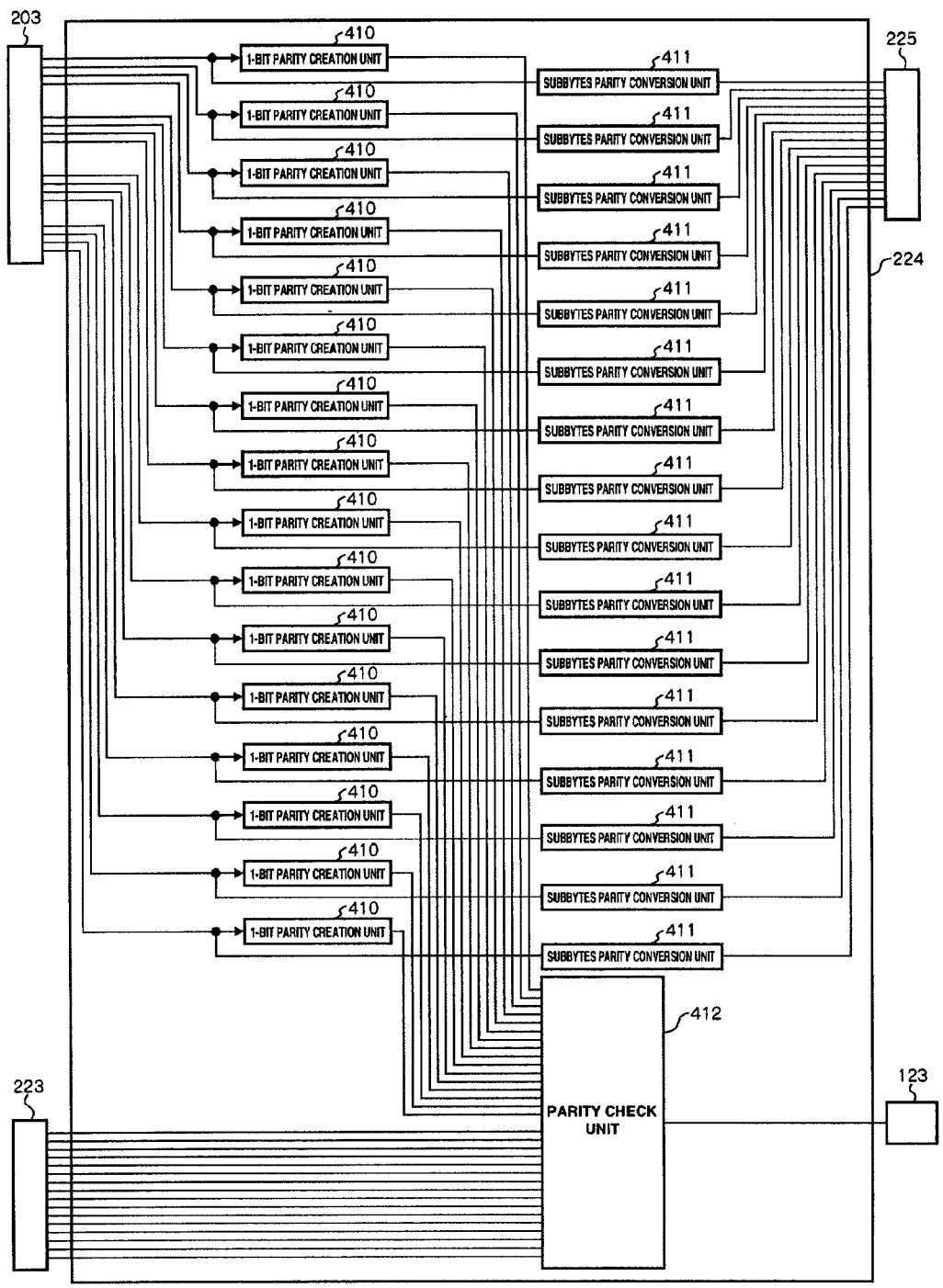
FIG. 8 is a block diagram explaining the details of a SubBytes parity arithmetic unit.

The SubBytes parity arithmetic unit 224 is now explained in detail with reference to FIG. 8. The SubBytes parity arithmetic unit 224 is configured from a parity creation unit 410, a SubBytes parity conversion unit 411, and a parity check unit 412. The parity creation unit 410 inputs 8-bit data and creates 1-bit parity. The SubBytes parity conversion unit 411 inputs the 8-bit data, and converts this into 1-bit parity using the S-box parity conversion table 500 shown in FIG. 5.

The parity check unit 412 compares the 16-bit parity data created from the 16 parity creation units 410 and the 16-bit data output from the selector 223 and, when the data are different, notifies an error to the error detection unit 123. Here, in order to protect the data to be processed with the SubBytes arithmetic unit 204 at a parity level, the SubBytes parity arithmetic unit 224 should output a value that is equivalent to the parity created from the output data of the SubBytes arithmetic unit 204.

Since the operation of the SubBytes arithmetic unit 204 is a nonlinear conversion operation to be performed to the 128-bit data to be input in 8-bit units, it is not possible to seek data that is equivalent to the parity created from the output data of the SubBytes arithmetic unit 204 directly from the data to be input from the selector 223 to the SubBytes parity arithmetic unit 224; that is, the data that is equivalent to the parity created from the output data of the selector 203. Thus, when the SubBytes parity arithmetic unit 224 is to seek the data that is equivalent to the parity created from the output data of the SubBytes arithmetic unit 204, the data to be output from the selector 203 will be required.

Thereby, when the SubBytes parity arithmetic unit 224 is to use the data to be output from the selector 203, the parity creation unit 410 and the parity check unit 412 are prepared to check whether an error has occurred in the output data of the selector 203 at a parity level. In light of the fact that the S-box parity conversion table used in the SubBytes parity conversion unit 412 is merely a table for directly converting the 8-bit data, which is the result of the S-box table conversion described in Non-Patent Document 1, into parity created from such 8-bit data, and the occurrence of an error in the operation up to the selector 203 is checked at a parity level using the output data of the selector 203 and the output data of the selector 223, protection of the operation to be performed by the SubBytes arithmetic unit 204 at a parity level is secured by the SubBytes parity arithmetic unit 224.

The ShiftRows parity arithmetic unit 225 is a computing means for inputting the output data from the SubBytes arithmetic unit 224, and outputting a value that is equivalent to the parity created from the output data from the ShiftRows arithmetic unit 205.

Figure 9:
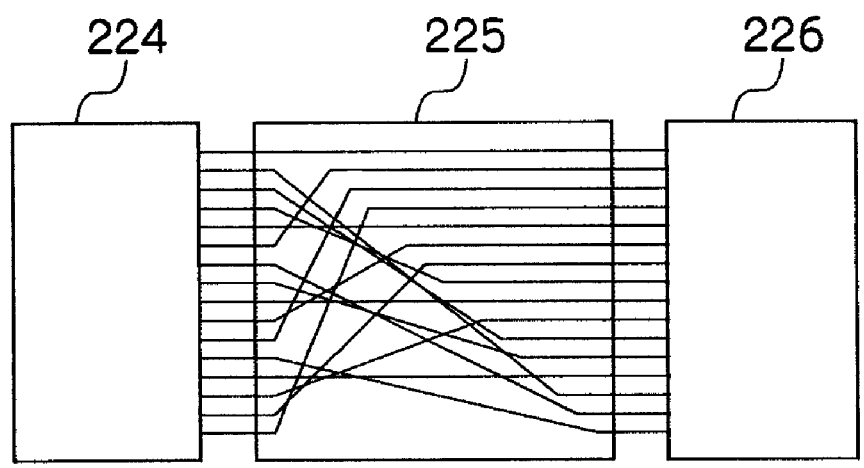
FIG. 9 is a block diagram explaining the details of a ShiftRows parity arithmetic unit.

The ShiftRows parity arithmetic unit 225 is now explained in detail with reference to FIG. 9. The ShiftRows parity arithmetic unit 225 sets the input 16-bit data to i[0] to i[15], and then performs rotate operation to i[0], i[4], i[8], i[12], performs rotate operation to i[1], i[5], i[9], i[13], performs rotate operation to i[2], i[6], i[10], i[14], and performs rotate operation i[3], i[7], i[1 1], i[15].

Here, in order to protect the data to be processed with the ShiftRows arithmetic unit 205 at a parity level, the ShiftRows parity arithmetic unit 225 should output a value that is equivalent to the parity created from the output data of the ShiftRows arithmetic unit 205. Operation to be performed by the ShiftRows arithmetic unit 205 is rotate operation in 8-bit units, and will not interact with the parity operation to be performed within 8 bits. Accordingly, protection of the operation to be performed by the ShiftRows arithmetic unit 205 at a parity level is secured by the ShiftRows parity arithmetic unit 225 which similar performs rotate operation in 1-bit units.

The MixColumns parity arithmetic unit 226 is a computing means for inputting the output data from the ShiftRows arithmetic unit 205 and the output data from the ShiftRows parity arithmetic unit 225, and outputting a value that is equivalent to the parity created from the output data of the MixColumns arithmetic unit 206.

Figure 10:
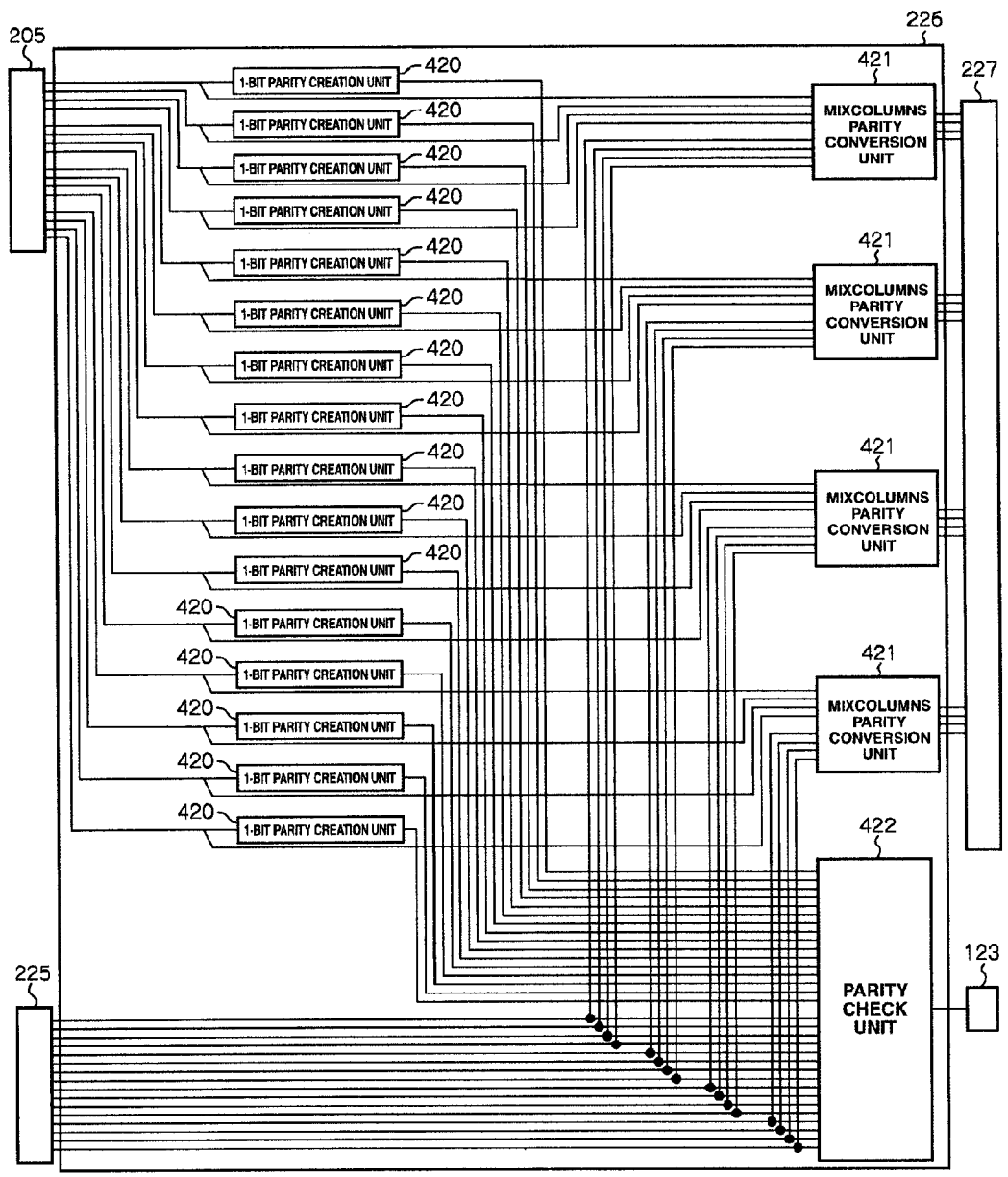
FIG. 10 is a block diagram explaining the details of a MixColumns parity arithmetic unit.

The MixColumns parity arithmetic unit 226 is now explained in detail with reference to FIG. 10. The MixColumns parity arithmetic unit 226 is configured from a parity creation unit 420, a MixColumns parity conversion unit 421, and a parity check unit 422. The parity creation unit 420 inputs 8-bit data and creates 1-bit parity. The MixColumns parity conversion unit 421 inputs a total of 4 bits including the uppermost bit in 8-bit units of the data obtained by partitioning the output data from the ShiftRows arithmetic unit 205 into 32-bit units, and the respective 4 bits obtained by partitioning the 16-bit output data from the ShiftRows parity arithmetic unit 225 into four segments, and then outputs 4-bit parity by performing the operation shown in FIG. 11.

Specifically, one MixColumns parity conversion unit 421 inputs the 127, 119, 111 and 103-bit output data from the ShiftRows arithmetic unit 205 and the 15, 14, 13 and 12-bit output data from the ShiftRows parity arithmetic unit 225, one MixColumns parity conversion unit 421 inputs the 95, 87, 79 and 71-bit output data from the ShiftRows arithmetic unit 205 and the 11, 10, 9 and 8-bit output data from the ShiftRows parity arithmetic unit 225, one MixColumns parity conversion unit 421 inputs the 63, 55, 47 and 39-bit output data from the ShiftRows arithmetic unit 205 and the 7, 6, 5 and 4-bit output data from the ShiftRows parity arithmetic unit 225, and one MixColumns parity conversion unit 421 inputs the 31, 23, 15 and 7-bit output data from the ShiftRows arithmetic unit 205 and the 3, 2, 1 and 0-bit output data from the ShiftRows parity arithmetic unit 225.

The MixColumns conversion unit 421 is now explained in detail with reference to FIG. 11. The uppermost bit of the 4-bit parity created with the MixColumns conversion unit 421 is a result of XORing the data of the uppermost bit and the second bit from the top of the 4-bit output data from the ShiftRows arithmetic unit 205, and all bits of the 4-bit output data from the ShiftRows parity arithmetic unit 225. During the XOR operation that seeks the uppermost bit, the MixColumns conversion unit 421 redundantly XORs the data of the second bit from the top of the output data from the ShiftRows parity arithmetic unit 225.

In addition, the second bit from the top of the 4-bit parity created with the MixColumns conversion unit 421 is a result of XORing the data of the second bit and third bit from the top of the 4-bit output data from the ShiftRows arithmetic unit 205, and all bits of the 4-bit output data from the ShiftRows parity arithmetic unit 225. During the XOR operation that seeks the second bit from the top, the MixColumns conversion unit 421 redundantly XORs the third bit from the top of the output data from the ShiftRows parity arithmetic unit 225.

In addition, the third bit from the top of the 4-bit parity created with the MixColumns conversion unit 421 is a result of XORing the data of the third bit from the top and the lowermost bit of the 4-bit output data from the ShiftRows arithmetic unit 205, and all bits of the 4-bit output data from the ShiftRows parity arithmetic unit 225. During the XOR operation that seeks the third bit from the top, the MixColumns conversion unit 421 redundantly XORs the data of the lowermost bit of the output data from the ShiftRows parity arithmetic unit 225.

In addition, the lowermost bit of the 4-bit parity created with the MixColumns conversion unit 421 is a result of XORing the data of the uppermost bit and the lowermost bit of the 4-bit output data from the ShiftRows arithmetic unit 205, and all bits of the 4-bit output data from the ShiftRows parity arithmetic unit 225. During the XOR operation that seeks the lowermost bit, the MixColumns conversion unit 421 redundantly XORs the data of the lowermost bit of the output data from the ShiftRows parity arithmetic unit 225.

The parity check unit 422 compares the 16-bit parity data created from 16 parity creation units 420, and the 16-bit output data from the ShiftRows parity arithmetic unit 225 and, if the data are different, notifies an error to the error detection unit 123. Here, in order to protect the data to be processed with the MixColumns arithmetic unit 206 at a parity level, the MixColumns parity arithmetic unit 226 should output a value that is equivalent to the parity created from the output data of the MixColumns arithmetic unit 206. Since the operations of the MixColumns arithmetic unit 206 are all configured from XOR operation, as described above, the parity creation operation is also configured only from XOR operation.

Figure 11:
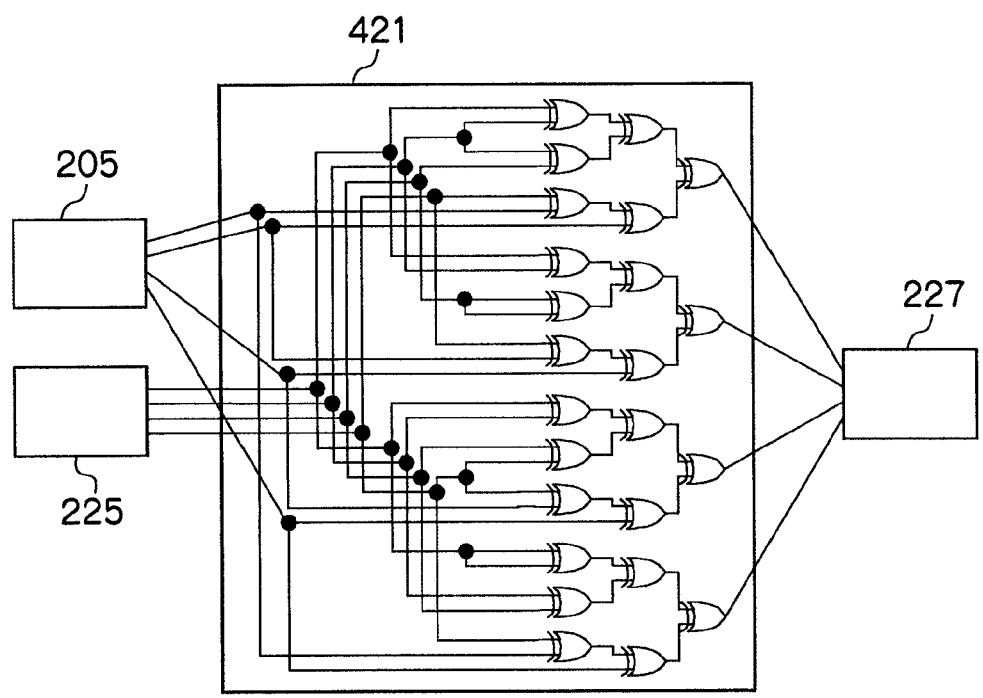
FIG. 11 is a block diagram explaining the details of a MixColumns parity conversion unit.

Accordingly, as shown in FIG. 11, although the output data from the ShiftRows parity arithmetic unit 225; that is, parity data of the ShiftRows result can be used in the MixColumns operation, a plurality of bits in the input data are redundantly XORed in the MixColumns operation as described above. Thus, in the operation to be performed by the MixColumns parity arithmetic unit 226, data of the MixColumns arithmetic unit 206 must be used to create proper parity.

Thus, when the MixColumns parity arithmetic unit 226 is to use the data output from the ShiftRows arithmetic unit 205, the parity creation unit 420 and the parity check unit 422 are prepared to check whether an error has occurred in the output data of the ShiftRows arithmetic unit 205 at a parity level.

In light of the fact that the priority of the MixColumns operation and the parity operation can be changed, and the occurrence of an error in the operation up to the ShiftRows parity arithmetic unit 225 is checked using the output data of the ShiftRows arithmetic unit 205 and the output data of the ShiftRows parity arithmetic unit 225 at a parity level, protection of the operation to be performed by the MixColumns arithmetic unit 206 is secured at a parity level by the MixColumns parity arithmetic unit 226.

The AddRoundKey parity arithmetic unit 227 inputs the output data from the KeyExpansion parity arithmetic unit 221 and the output data from the MixColumns parity arithmetic unit 226, and performs the same operation as the AddRoundKey parity arithmetic unit 222.

the SubBytes parity arithmetic unit 228 inputs the output data from the AddRoundKey parity arithmetic unit 227 and the output data from the AddRoundKey parity arithmetic unit 227, and performs the same operation as the SubBytes parity arithmetic unit 224.

The ShiftRows parity arithmetic unit 229 inputs the output data from the SubBytes parity arithmetic unit 228, and performs the same operation as the ShiftRows parity arithmetic unit 225.

The AddRoundKey parity arithmetic unit 230 inputs the output data from the KeyExpansion parity arithmetic unit 221 and the output data from the ShiftRows parity arithmetic unit 229, and performs the same operation as the AddRoundKey parity arithmetic unit 222.

According to the foregoing configuration, the storage system of Embodiment 1 is able to detect an error at a parity level using the AES encrypted parity arithmetic unit 133 prepared separately from the AES unit 130 even if a soft error occurs in the AES unit 130.

Further, with the AES encryption means of the storage system for protecting data based on 8-bit parity shown in Embodiment 1, since the AES encrypted parity computing means configured from the AES encrypted parity arithmetic unit 133 will be ⅛ the circuit size of the AES encryption means configured from the AES unit 130, it is possible to reduce the circuit size to roughly 56% in comparison to an AES encryption means adopting an error-detectable dual redundant system. This is because the output bits of the respective operations of KeyExpansion (RotWord and SubWord), AddRoundKey, SubBytes, ShiftRows and MixColumns, which are the respective functions of the AES encryption means, have been compressed from 8 bits to 1 bit.

In addition, with the AES encryption means of the storage system for protecting data based on 8-bit parity shown in Embodiment 1, the data protection strength can be changed in accordance with the error rate error in comparison to an AES encryption means adopting an error-detectable dual redundant system. For example, if the soft error rate is at a level of causing an error in only 1 bit among the 8 bits, it would suffice to detect errors by creating parity in 8-bit units. Moreover, it would be efficient to create parity in 2/4/8-bit units to the AES encryption means shown in Embodiment 1. This is because the AES operation processing unit is 128 bits, and SubBytes, ShiftRows and MixColumns, which are the internal operations of AES, respectively handle a different data area of the input 128-bit data.

In other words, with AES, the input 128-bit data is partitioned into 8-bit units (here, the partitioned data shall be i[0] to i[15]), SubBytes computes the input data in 8-bit units (i[j](j=0 to 15); to be computed respectively), ShiftRows computes the input data in 32-bit units (rotate operation is performed to i[0], i[4], i[8], i[12], rotate operation is performed to i[1], i[5], i[9], i[13], rotate operation is performed to i[2], i[6], i[10], i[14], and rotate operation is performed to i[3], i[7], i[11], i[15]), MixColumns computes [the input data] in 32-bit units (multiplication on GF($2^8$) to i[0], i[1], i[2], i[3], multiplication on GF($2^8$) to i[4], i[5], i[6], i[7], multiplication on GF($2^8$) to i[8], i[9], i[10], i[11], and multiplication on GF($2^8$) to i[12], i[13], i[14], i[15]). In addition, since the AES operation processing unit is 128 bits, it is desirable that the created parity is a divisor of 128 bits. Thus, it would be efficient to create parity in 2/4/8-bit units to the AES encryption means.

Incidentally, explanation on the AES decryption means is omitted because the AES decrypted parity computing means that handles the error detection of the AES decryption means can be easily imaged from the applicable technology of the AES encrypted parity computing means described in the present Embodiment, and by referring to Non-Patent Document 1.

By way of precaution, the outline of the AES decrypted parity computing means is explained below. In this case, the AES decryption means that decrypts the encrypted text block into a plain text block based on the AES operation comprises a RotWord computing means, a SubWord computing means, an AddRoundKey computing means, an InvSubBytes computing means, an InvShiftRows computing means, and an InvMixColumns computing means in the AES operation. The AES decrypted parity computing means for outputting the data to be used to check the final result of the AES decryption means inputs the parity data created based on the XOR operation from an encryption key to be used as a key during the AES decryption, parity data created based on the XOR operation from an encrypted text block, and the AES operation halfway result output from the AES decryption means, and outputs a value that is equivalent to the parity data created based on the XOR operation from the final result output from the AES decryption means.

The AES decrypted parity computing means comprises a RotWord parity computing means, a SubWord parity computing means, an AddRoundKey parity computing means, an InvSubBytes parity computing means, an InvShiftRows parity computing means, and an InvMixColumns parity computing means.

The InvSubBytes parity computing means comprises an InvSubBytes parity computing means internal parity creation means for inputting the output data from the AddRoundKey computing means or the output data from the InvShiftRows computing means and the output data from the AddRoundKey parity computing means or the output data from the InvShiftRows parity computing means, and creating parity data by performing XOR operation to the output data from the AddRoundKey computing means or the output data from the InvShiftRows computing means; an InvSubBytes parity computing means internal parity check means for comparing the parity data created with the InvSubBytes parity computing means internal parity creation means and the output data from the AddRoundKey parity computing means or the output data from the InvShiftRows parity computing means; and an InvSubBytes parity computing means internal inverse S-box parity transposition means for directly converting the parity data created from the output data of the inverse S-box transposition means in the AES operation into data units in which the input data from the AddRoundKey computing means or the input data from the InvShiftRows computing means are partitioned into 16 segments, and outputting a value that is equivalent to the parity created from the output data of the InvSubBytes computing means in the AES decryption means.

The InvShiftRows parity computing means inputs the output data from the AddRoundKey parity computing means or the output data from the InvMixColumns parity computing means or the output data from the InvSubBytes parity computing means, and performs rotate operation to the data units in which the input data was partitioned into 16 segments so as to output a value that is equivalent to the parity data created from the output data of the InvShiftRows computing means in the AES operation.

The InvMixColumns parity computing means comprises an InvMixColumns parity computing means internal parity creation means for inputting the output data from the AddRoundKey computing means or the output data from the InvShiftRows computing means and the output data from the AddRoundKey parity computing means or the output data from the InvShiftRows parity computing means, and creating parity data by performing XOR operation to the input data from the AddRoundKey computing means or the input data from the InvShiftRows computing means; and an InvMixColumns parity computing means internal parity check means for comparing the parity data created with the InvMixColumns parity computing means internal parity creation means and the input data from the AddRoundKey parity computing means or the input data from the InvShiftRows parity computing means, and outputs a value that is equivalent to the parity created from the output data from the InvMixColumns computing means in the AES decryption means by performing XOR operation to the respective uppermost data of data obtained by dividing the input data from the AddRoundKey computing means or the input data from the InvShiftRows computing means into 4 segments, and then further dividing such data into 4 segment.

(2) Embodiment 2

The second embodiment of the present invention is now explained in detail with reference to the attached drawings.

Figure 12:
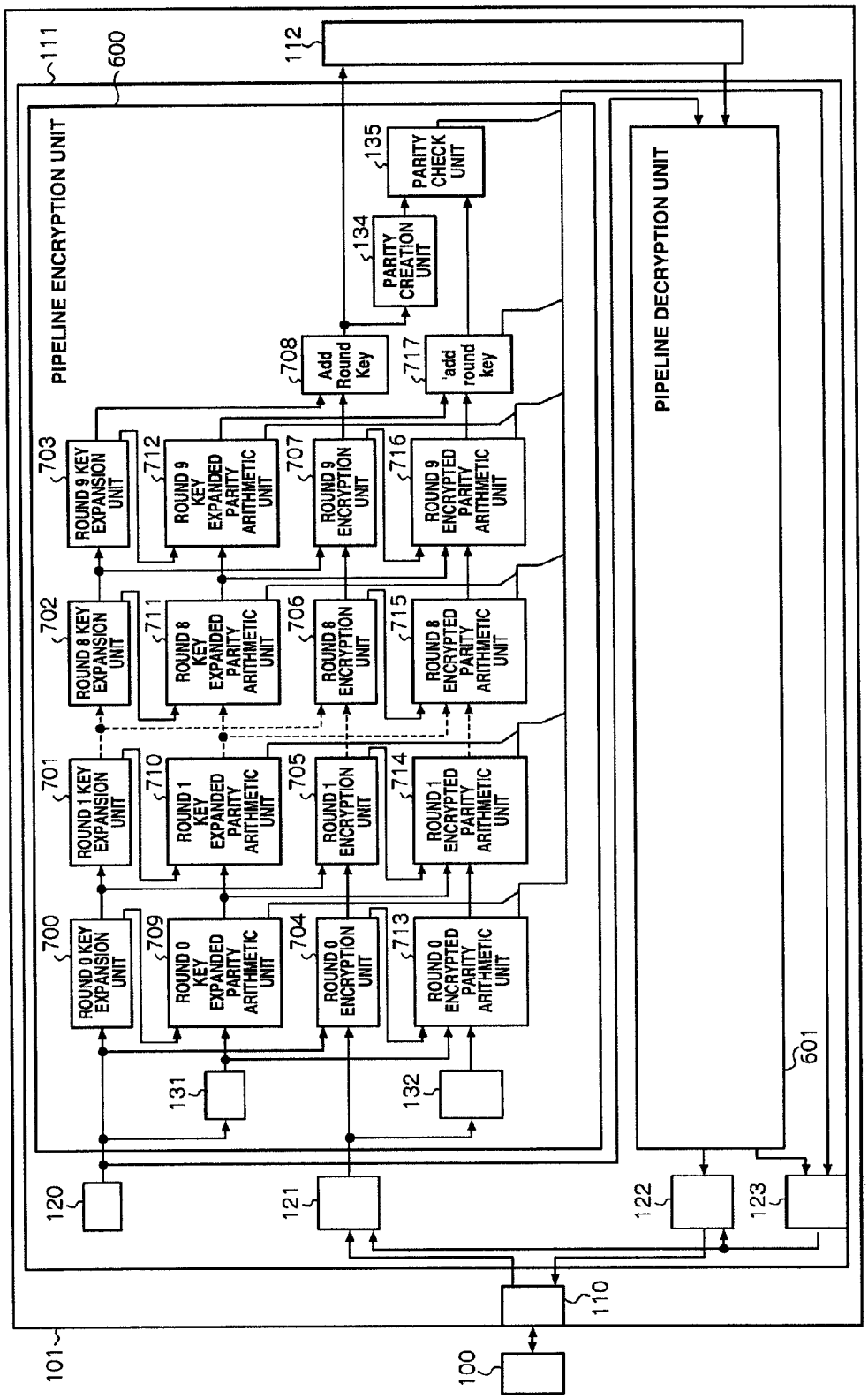
FIG. 12 is a block diagram showing another embodiment of the present invention.

FIG. 12 is a configuration diagram showing the storage system for protecting data by encrypting (decrypting) data to be stored in the storage 112 based on AES by using an encryption key having a key length of 128 bits and creating parity of such data in 8-bit units. The AES encryption (decryption) means of the storage system shown in FIG. 12 is adopting a pipeline architecture capable of partitioning the internal processing of the AES encryption (decryption) means into a plurality of stages, and performing serial processing in data block units. In Embodiment 2, let it also be assumed that data is aligned in Big Endian, and components with the same reference numeral in all drawings have the same function and, therefore, the detailed explanation thereof is omitted.

In FIG. 12, the pipeline encryption unit 600 is an encryption unit in which the AES encryption means was partitioned and pipelines into a plurality of segments, and the pipeline decryption unit 601 is a decryption unit in which the AES decryption means was partitioned and pipelined into a plurality of segments.

The pipeline encryption unit 600 is configured from parity creation units 131, 132, 134, a parity check unit 135, key expansion units 700 to 703 of round 0 to round 9, encryption units 704 to 707 of round 0 to round 9, an AddRoundKey arithmetic unit 708, key expansion parity arithmetic units 710 to 712 of round 0 to round 9, encrypted parity arithmetic units 713 to 716 of round 0 to round 9, and an AddRoundKey parity arithmetic unit 717.

The key expansion units 700 to 703 of rounds 0 to 9 are configured from the KeyExpansion arithmetic unit 201, and create the extended key required in the encryption of the respective rounds.

The encryption units 704 to 706 of rounds 0 to 9 are configured from the AddRoundKey arithmetic unit 202, the SubBytes arithmetic unit 204, the ShiftRows arithmetic unit 205, and the MixColumns arithmetic unit 206. The AddRoundKey arithmetic unit in the encryption units 704 to 706 of rounds 0 to 9 inputs the output data from the key buffer 120 or the output data from the key expansion units 700 to 703 of round 0 to round 8 corresponding to the respective rounds, or the output data from the write controller 121 or the encryption units 704 to 706 of round 0 to round 8 corresponding to the respective rounds, and performs operation that is equivalent to the AddRoundKey arithmetic unit 202.

The SubBytes arithmetic unit in the encryption units 704 to 706 of round 0 to round 8 inputs the data output from the AddRoundKey arithmetic unit in the encryption units 704 to 706 of round 0 to round 8, and performs operation that is equivalent to the SubBytes arithmetic unit 204. The ShiftRows arithmetic unit in the encryption units 704 to 706 of round 0 to round 8 inputs the data output from the SubBytes arithmetic unit in the encryption units 704 to 706 of round 0 to round 8, and performs operation that is equivalent to the ShiftRows arithmetic unit 205. The MixColumns arithmetic unit in the encryption units 704 to 706 of round 0 to round 8 inputs data output from the ShiftRows arithmetic unit in the encryption units 704 to 706 of round 0 to round 8, and performs operation that is equivalent to the MixColumns arithmetic unit 206.

The encryption unit 707 of round 9 is configured from the AddRoundKey arithmetic unit 202, the SubBytes arithmetic unit 204, and the ShiftRows arithmetic unit 205. The AddRoundKey arithmetic unit in the encryption unit 707 of round 9 inputs output data from the key expansion unit 703 of round 9 and the output data from the encryption unit 706 of round 8, and performs operation that is equivalent to the AddRoundKey arithmetic unit 202. The SubBytes arithmetic unit in the encryption unit 707 of round 9 inputs data output from the AddRoundKey arithmetic unit in the encryption unit 707 of round 9, and performs operation that is equivalent to the SubBytes arithmetic unit 204. The ShiftRows arithmetic unit in the encryption unit 707 of round 9 inputs data output from the SubBytes arithmetic unit in the encryption unit 707 of round 9, and performs operation that is equivalent to the ShiftRows arithmetic unit 205.

The AddRoundKey arithmetic unit 708 inputs the output data from the key expansion unit 703 of round 9 and the data output from the encryption unit 707 of round 9, and performs operation that is equivalent to the AddRoundKey arithmetic unit 202.

The key expansion parity arithmetic units 709 to 712 of rounds 0 to 9 are configured from the KeyExpansion parity arithmetic unit 221, and create the extended key parity of the respective rounds.

The encrypted parity arithmetic units 713 to 715 of rounds 0 to 8 are configured from the AddRoundKey parity arithmetic unit 222, the SubBytes parity arithmetic unit 224, the ShiftRows parity arithmetic unit 225, and the MixColumns parity arithmetic unit 226. The AddRoundKey parity arithmetic unit in the encrypted parity arithmetic units 713 to 715 of rounds 0 to 8 input the output data from the parity creation unit 131 or the output data from the key expansion parity arithmetic units 709 to 711 of rounds 0 to round 8 corresponding to the respective rounds or the output data from the parity creation unit 132 or the output data from the encrypted parity arithmetic units 713 to 715 of round 0 to round 8 corresponding to the respective rounds, and performs operation that is equivalent to the AddRoundKey parity arithmetic unit 222.

The SubBytes parity arithmetic unit in the encrypted parity arithmetic units 713 to 715 of rounds 0 to 8 inputs the output data from the AddRoundKey arithmetic unit of the respectively corresponding encryption units 704 to 706 of round 0 to round 8 and the output data output from the AddRoundKey parity arithmetic unit in the encrypted parity arithmetic units 713 to 715 of rounds 0 to 8, and performs operation that is equivalent to the SubBytes parity arithmetic unit 224. The ShiftRows parity arithmetic unit in the encrypted parity arithmetic units 713 to 715 of rounds 0 to 8 inputs the output data output from the SubBytes parity arithmetic unit in the encrypted parity arithmetic units 713 to 715 of rounds 0 to 8, and performs operation that is equivalent to the ShiftRows parity arithmetic unit 225.

The MixColumns parity arithmetic unit in the encrypted parity arithmetic units 713 to 715 of rounds 0 to 8 inputs the output data from the ShiftRows arithmetic unit of the respectively corresponding encryption units 704 to 706 of round 0 to round 8 and the output data output from the ShiftRows parity arithmetic unit in the encrypted parity arithmetic units 713 to 715 of rounds 0 to 8, and performs operation that is equivalent to the MixColumns parity arithmetic unit 226.

The encrypted parity arithmetic unit 716 of round 9 is configured from the AddRoundKey parity arithmetic unit 222, the SubBytes parity arithmetic unit 224, and the ShiftRows parity arithmetic unit 225. The AddRoundKey parity arithmetic unit in the encrypted parity arithmetic unit 716 of round 9 inputs the output data from the key expansion parity arithmetic unit 711 of round 8 and the output data from the encrypted parity arithmetic unit 715 of round 8, and performs operation that is equivalent to the AddRoundKey parity arithmetic unit 222. The SubBytes parity arithmetic unit in the encrypted parity arithmetic unit 716 of round 9 inputs the output data from the AddRoundKey arithmetic unit of the encryption unit 707 of round 9 and the output data output from the AddRoundKey parity arithmetic unit in the encrypted parity arithmetic unit 716 of round 9, and performs operation that is equivalent to the SubBytes parity arithmetic unit 224.

The ShiftRows parity arithmetic unit in the encrypted parity arithmetic unit 716 of round 9 inputs the output data output from the SubBytes parity arithmetic unit in the encrypted parity arithmetic unit 716 of round 9, and performs operation that is equivalent to the ShiftRows parity arithmetic unit 225.

The AddRoundKey parity arithmetic unit 717 inputs the output data from the key expansion parity arithmetic unit 712 of round 9 and the output data output from the encrypted parity arithmetic unit 716 of round 9, and performs operation that is equivalent to the AddRoundKey parity arithmetic unit 202.

According to the foregoing configuration, the storage system of Embodiment 2 is able to detect errors at a parity level based on the key expansion parity arithmetic units 709 to 712 of round 0 to round 9, encrypted parity arithmetic units 713 to 716 of round 0 to round 9, and the AddRoundKey parity arithmetic unit 717 even when a soft error occurs in the key expansion units 700 to 703 of round 0 to round 9, or the encryption units 704 to 707 of round 0 to round 9, or the AddRoundKey arithmetic unit 708.

When the storage system of Embodiment 2 is to protect data based on the parity created in 8-bit units, it is possible to reduce the circuit size to roughly 60% in comparison to an AES encryption means adopting an error-detectable multiplexing system (duplex system).

In addition, with the AES encryption means of the storage system shown in Embodiment 2, the data protection strength can be changed in accordance with the error rate error.

Incidentally, explanation on the AES pipeline decryption means 601 is omitted because the AES decrypted parity computing means that handles the error detection of the AES decryption means can be easily imaged from the applicable technology of the AES encrypted parity computing means described in the present Embodiment, and by referring to Non-Patent Document 1.

(3) Operation and Effect

The present invention is an AES parity computing means for outputting data to be used in checking the final result of the AES encryption means in the storage system which encrypts the data to be stored with AES and stores such data in the storage. The AES parity computing means comprises a RotWord parity computing means, a SubWord parity computing means, an AddRoundKey parity computing means, a SubBytes parity computing means, a ShiftRows parity computing means, and a MixColumns parity computing means. The AES parity computing means inputs the parity (encryption key parity) created from the encryption key to be used in the AES encryption, the parity (data parity) created from the data input to the AES encryption means, and the AES halfway result out from the AES encryption means, and outputs a value that is equivalent to the parity created from the final result output from the AES encryption means.

The RotWord parity computing means inputs the encryption key parity, divides the encryption key in 32-bit units in the AES encryption means, and outputs a value that is equivalent to the parity created from the output data of the RotWord computing means which performs rotate operation to such 32 bits in 8-bit units.

The SubWord parity computing means inputs the data output from the RotWord parity computing means and the data output from the RotWord computing means in the AES encryption means, and outputs a value that is equivalent to the parity created from the output data of the SubWord computing means that performs nonlinear conversion in 8-bit units based on the S-box in the AES encryption means.

Here, the SubWord parity computing means creates parity from the data output from the RotWord computing means in the AES encryption means to be input, and compares the created parity and the data output from the RotWord parity computing means to be input separately as described above.

The AddRoundKey parity computing means inputs the encryption key parity and the data parity, inputs the encryption key and the data in the AES encryption means, and outputs a value that is equivalent to the parity created from the output data of the AddRoundKey computing means that performs XOR operation to the two inputs.

The SubBytes parity computing means inputs the data output from the AddRoundKey parity computing means and the data output from the AddRoundKey computing means, inputs the data output from the AddRoundKey computing means in the AES encryption means, and outputs a value that is equivalent to the parity created from the data output from the SubBytes computing means that performs nonlinear conversion in 8-bit units based on the S-box.

Here, the SubBytes parity computing means creates parity from the data output from the AddRoundKey computing means to be input, and compares the created parity and the data output from the AddRoundKey parity computing means to be separately input as described above.

The ShiftRows parity computing means inputs the data output from the SubBytes parity computing means, and outputs a value that is equivalent to the parity created from the data output from the ShiftRows computing means that performs rotate operation in 8-bit units in the AES encryption means.

The MixColumns parity computing means inputs the data output from the ShiftRows parity computing means and the data output from the ShiftRows computing means in the AES encryption means, inputs the data output from the ShiftRows computing means in the AES encryption means, and outputs a value that is equivalent to the parity created from the data output from the MixColumns computing means that multiplies data on the $GF(2^8)$ in 32-bit units.

Here, the MixColumns parity computing means creates parity from the data output from the ShiftRows computing means in the AES encryption means to be input, and compares the created parity and the data output from the ShiftRows computing means in the AES encryption means to be separately input as described above.

Accordingly, as a result of comparing the parity created from the final result output from the AES encryption means and the final result output from the AES parity computing means, it is possible to detect an error in the final result upon encrypting the data to be stored based on AES. Data to be stored can thereby be protected.

When protecting data with parity computed in 8-bit units, the circuit size can be reduced to roughly 60% in comparison to a storage system or a computer system with a dual redundant AES unit means. The data protection strength will differ based on the data unit for acquiring the parity. In the case of protecting data with parity computed in 8-bit units, the occurrence of soft errors can be detected as many as the number of 1/3/5/7 bits. In other words, the circuit size can be reduce in comparison to a data protection method based on multiplexing, and soft errors can be detected at a parity level throughout the AES circuit.

Although the present Embodiment explained a case of encrypting (decrypting) data to be stored in a storage based on AES by using an encryption key having a key length of 128 bits, the present invention is not limited thereto and, for instance, may be broadly applied to private key cryptography such as DES (Data Encryption Standard) or IDEA (International Data Encryption Algorithm), public key cryptography such as RSA (Rivest Shamir Adleman), and other operation methods.

By way of precaution, the outline of the error detection/correction code computing means in the foregoing case is explained below. The error detection/correction code computing means comprises an error detection/correction code connectivity formation computing means, and an error detection/correction code connectivity non-formation computing means.

The error detection/correction code connectivity formation computing means is configured from the operation seeking the error detection/correction code, the operation that realizes the associative law, or the combination thereof. The error detection/correction code connectivity formation computing means comprises a 1-input, 1-output error detection/correction code computing means for inputting the error detection/correction code created from the input data to the error detection/correction code connectivity formation computing means, and outputting a value that is equivalent to the error detection/correction code created from the output data of the error detection/correction code connectivity formation computing means.

The error detection/correction code connectivity non-formation computing means is configured from the operation seeking the error detection/correction code, the operation that does not realize the associative law, or the combination thereof. The error detection/correction code connectivity non-formation computing means comprises error detection/correction code creation means for inputting data that is equivalent to the input data to the error detection/correction code connectivity non-formation computing means and the error detection/correction code created from the input data to the error detection/correction code connectivity non-formation computing means, and creating a error detection/correction code from the data that is equivalent to the input data to the error detection/correction code connectivity non-formation computing means; error detection/correction code check means for comparing the output data of the error detection/correction code creation means and the error detection/correction code created from the input data to the error detection/correction code connectivity non-formation computing means, and detecting and correcting the error; and a 2-input, 1-output error detection/correction code computing means for directly converting the data that is equivalent to the input data to the error detection/correction code connectivity non-formation computing means into a value that is equivalent to the error detection/correction code created from the output value of the error detection/correction code connectivity non-formation computing means.

The error detection/correction code computing means inputs the output data of the computing means in the front part of the 1-input, 1-output error detection/correction code computing means in the 1-input, 1-output error detection/correction code computing means, inputs the halfway result of the 1-input, 1-output error detection/correction code computing means in the 2-input, 1-output error detection/correction code computing means, and inputs the output data of the computing means in the front part of the 2-input, 1-output error detection/correction code computing means so as to output a value that is equivalent to the error detection/correction code created from the output data of the 1-input, 1-output error detection/correction code computing means.

The present invention yields a superior effect as a highly reliable system that needs to protect data from soft errors. As examples of this system, a data encryption system in a disk array system, a server for encoding and decoding video contents and the like may be considered.

What is claimed is:

1. An arithmetic logical unit for outputting data to be used in checking the final result of an AES unit that encrypts a plain text block into an encrypted text block based on AES operation, comprising:
    a processor; and
    an arithmetic unit for computing parity data created based on XOR operation from an encryption key to be used as a key during AES encryption, parity data created based on XOR operation from a plain text block, and an AES operation halfway result output from said AES unit, and outputting a value that is equivalent to parity data created based on XOR operation from the final result of said AES unit;
    wherein said arithmetic unit includes:
    a RotWord parity arithmetic unit for performing rotate operation to parity data created based on XOR operation from said encryption key, or parity data created based on XOR operation from an extended key in AES operation of said AES unit so as to rotate said parity data into data units where the lower ¼ area is divided into four segments. and outputting a value that is equivalent to parity data created from output data after RotWord operation in said AES unit; and
    a SubWord parity arithmetic unit for outputting a value that is equivalent to parity data created from output data after SubWord operation in said AES unit; and
    wherein said SubWord parity arithmetic unit includes:
    a SubWord parity creation unit for creating parity data by performing XOR operation to output data after RotWord operation in said AES unit; and
    a SubWord parity check unit for comparing parity data created based on said SubWord parity creation unit and output data from said RotWord parity arithmetic unit.

2. The arithmetic logical unit according to claim 1,
wherein said arithmetic unit includes:
an AddRoundKey parity arithmetic unit for performing XOR operation to parity data created based on XOR operation from said encryption key or data created based on output data after SubWord operation in said AES unit and parity data created from a plain text block or data created based on output data after AddRoundKey operation in said AES unit, and outputting a value that is equivalent to parity data created from output data after AddRoundKey operation in said AES unit; and
a SubBytes parity arithmetic unit for outputting a value that is equivalent to parity data created from output data after SubBytes operation in said AES unit; and
wherein said SubBytes parity arithmetic unit includes:
a SubBytes parity creation unit for creating parity data by performing XOR operation to output data after AddRoundKey operation in said AES unit; and
a SubBytes parity check unit for comparing parity data created based on said SubBytes parity creation unit and output data from said AddRoundKey parity arithmetic unit.

3. The arithmetic logical unit according to claim 2, further comprising:
a ShiftRows parity arithmetic unit for performing rotate operation to output data from said SubBytes parity arithmetic unit so as to rotate said output data into sixteen segments, and outputting a value that is equivalent to parity data created from output data after ShiftRows operation in said AES unit; and
a MixColumns parity arithmetic unit for outputting a value that is equivalent to parity created from output data after MixColumns operation in said AES unit;
wherein said MixColumns parity arithmetic unit includes:
a MixColumns parity creation unit for creating parity data by performing XOR operation to output data after ShiftRows operation in said AES unit; and
a MixColumns parity check unit for comparing parity data created based on said MixColumns parity creation unit and output data from said ShiftRows parity arithmetic unit.

4. A computation method of an arithmetic logical unit for outputting data to be used in checking the final result of an AES unit that encrypts a plain text block into an encrypted text block based on AES operation, comprising:
a computing step of computing parity data created based on XOR operation from an encryption key to be used as a key during AES encryption, parity data created based on XOR operation from a plain text block, and an AES operation halfway result output from said AES unit, and outputting a value that is equivalent to parity data created based on XOR operation from the final result of said AES unit;
wherein said computing step includes:
a RotWord parity computing step of a RotWord parity arithmetic unit performing rotate operation to parity data created based on XOR operation from said encryption key, or parity data created based on XOR operation from an extended key in AES operation of said AES unit so as to rotate said parity data into data units where the lower ¼ area is divided into four segments, and outputting a value that is equivalent to parity data created from output data after RotWord operation in said AES unit; and
a SubWord parity computing step of a SubWord parity arithmetic unit outputting a value that is equivalent to parity data created from output data after SubWord operation in said AES unit; and wherein said SubWord parity computing step includes:
a SubWord parity creation step of a SubWord parity creation unit creating parity data by performing XOR operation to output data after RotWord operation in said AES unit; and
a SubWord parity check step of a SubWord parity check unit comparing parity data created based on said SubWord parity creation unit and output data from said RotWord parity arithmetic unit.

5. The computation method according to claim 4,
wherein said computing step includes:
an AddRoundKey parity computing step of an AddRoundKey parity arithmetic unit performing XOR operation to parity data created based on XOR operation from said encryption key or data created based on output data after SubWord operation in said AES unit and parity data created from a plain text block or data created based on output data after AddRoundKey operation in said AES unit, and outputting a value that is equivalent to parity data created from output data after AddRoundKey operation in said AES unit; and
a SubBytes parity computing step of a SubBytes parity arithmetic unit outputting a value that is equivalent to parity data created from output data after SubBytes operation in said AES unit; and
wherein said SubBytes parity computing step includes:
a SubBytes parity creation step of a SubBytes parity creation unit creating parity data by performing XOR operation to output data after AddRoundKey operation in said AES unit; and
a SubBytes parity check step of a SubBytes parity check unit comparing parity data created based on said SubBytes parity creation unit and output data from said AddRoundKey parity arithmetic unit.

6. The computation method according to claim 5, further comprising:
a ShiftRows parity computing step of a ShiftRows parity arithmetic unit performing rotate operation to output data from said SubBytes parity arithmetic unit so as to rotate said output data into sixteen segments, and outputting a value that is equivalent to parity data created from output data after ShiftRows operation in said AES unit; and
a MixColumns parity computing step of a MixColumns parity arithmetic unit outputting a value that is equivalent to parity created from output data after MixColumns operation in said AES unit;
wherein said MixColumns parity arithmetic unit includes:
a MixColumns parity creation step of a MixColumns parity creation unit creating parity data by performing XOR operation to output data after ShiftRows operation in said AES unit; and
a MixColumns parity check step of a MixColumns parity check unit comparing parity data created based on said MixColumns parity creation unit and output data from said ShiftRows parity arithmetic unit.

7. A computer system for storing data sent from a host system, comprising:
an AES unit that encrypts data sent from said host system from a plain text block into an encrypted text block based on AES operation;
an arithmetic unit for outputting data to be used in checking the final result of said AES unit; and
a parity check unit for comparing parity data created based on XOR operation from the final result of said AES unit, and the final result of said arithmetic unit;

wherein said arithmetic unit computes parity data created based on XOR operation from an encryption key to be used as a key during AES encryption, parity data created based on XOR operation from a plain text block, and an AES operation halfway result output from said AES unit, and outputs a value that is equivalent to parity data created based on XOR operation from the final result of said AES unit;

wherein said arithmetic unit includes:

a RotWord parity arithmetic unit for performing rotate operation to parity data created based on XOR operation from said encryption key, or parity data created based on XOR operation from an extended key in AES operation of said AES unit so as to rotate said parity data into data units where the lower ¼ area is divided into four segments, and outputting a value that is equivalent to parity data created from output data after RotWord operation in said AES unit; and a SubWord parity arithmetic unit for outputting a value that is equivalent to parity data created from output data after SubWord operation in said AES unit; and wherein said SubWord parity arithmetic unit includes:

a SubWord parity creation unit for creating parity data by performing XOR operation to output data after RotWord operation in said AES unit;

a SubWord parity check unit for comparing parity data created based on said SubWord parity creation unit and output data from said RotWord parity arithmetic unit; and SubWord parity S-box transposition means for directly converting the lower ¼ area of output data after RotWord operation in said AES unit into data units divided into four segments based on S-box transposition.

8. The computer system according to claim 7, wherein said arithmetic unit includes:

an AddRoundKey parity arithmetic unit for performing XOR operation to parity data created based on XOR operation from said encryption key or data created based on output data after SubWord operation in said AES unit and parity data created from a plain text block or data created based on output data after AddRoundKey operation in said AES unit, and outputting a value that is equivalent to parity data created from output data after AddRoundKey operation in said AES unit; and a SubBytes parity arithmetic unit for outputting a value that is equivalent to parity data created from output data after SubBytes operation in said AES unit; and wherein said SubBytes parity arithmetic unit includes:

a SubBytes parity creation unit for creating parity data by performing XOR operation to output data after AddRoundKey operation in said AES unit;

a SubBytes parity check unit for comparing parity data created based on said SubBytes parity creation unit and output data from said AddRoundKey parity arithmetic unit; and SubWord parity S-box transposition means for directly converting output data after AddRoundKey operation in said AES unit into data units divided into sixteen segments based on S-box transposition.

9. The computer system according to claim 8, further comprising:

a ShiftRows parity arithmetic unit for performing rotate operation to output data from said SubBytes parity arithmetic unit so as to rotate said output data into sixteen segments, and outputting a value that is equivalent to parity data created from output data after ShiftRows operation in said AES unit; and a MixColumns parity arithmetic unit for outputting a value that is equivalent to parity created from output data after MixColumns operation in said AES unit;

wherein said MixColumns parity arithmetic unit includes:

a MixColumns parity creation unit for creating parity data by performing XOR operation to output data after ShiftRows operation in said AES unit;

a MixColumns parity check unit for comparing parity data created based on said MixColumns parity creation unit and output data from said ShiftRows parity arithmetic unit; and a MixColumns parity XOR arithmetic unit for performing XOR operation to each upper data of data in which output data after ShiftRows operation in said AES unit was divided into four segments was further divided into four segments, and output data from ShiftRows parity computing means.

10. An arithmetic logical unit for outputting data to be used in checking the final result of an AES decryption unit that decrypts an encrypted text block into a plain text block based on AES operation, comprising:

a processor; and an arithmetic unit for computing parity data created based on XOR operation from a decryption key to be used as a key during AES decryption, parity data created based on XOR operation from an encrypted text block, and an AES operation halfway result output from said AES decryption unit, and outputting a value that is equivalent to parity data created based on XOR operation from the final result of said AES decryption unit;

wherein said arithmetic unit includes:

a RotWord parity arithmetic unit for performing rotate operation to parity data created based on XOR operation from said encryption key, or parity data created based on XOR operation from an extended key in AES operation of said AES unit so as to rotate said parity data into data units where the lower ¼ area is divided into four segments, and outputting a value that is equivalent to parity data created from output data after RotWord operation in said AES unit; and a SubWord parity arithmetic unit for outputting a value that is equivalent to parity data created from output data after SubWord operation in said AES unit; and wherein said SubWord parity arithmetic unit includes:

a SubWord parity creation unit for creating parity data by performing XOR operation to output data after RotWord operation in said AES unit; and a SubWord parity check unit for comparing parity data created based on said SubWord parity creation unit and output data from said RotWord parity arithmetic unit.

* * * * *